United States Patent [19]

Witek et al.

[11] Patent Number: 5,148,536
[45] Date of Patent: Sep. 15, 1992

[54] PIPELINE HAVING AN INTEGRAL CACHE WHICH PROCESSES CACHE MISSES AND LOADS DATA IN PARALLEL

[75] Inventors: Richard T. Witek, Littleton; Douglas D. Williams, Pepperell; Timothy J. Stanley, Leominster; David M. Fenwick, Chelmsford; Douglas J. Burns, Billerica; Rebecca L. Stamm, Newton; Richard Heye, Somerville, all of Mass.

[73] Assignee: Digital Equipment Corporation, Maynard, Mass.

[21] Appl. No.: 224,483

[22] Filed: Jul. 25, 1988

[51] Int. Cl.[5] .............................................. G06F 9/38
[52] U.S. Cl. ........................ 395/425; 364/243.41; 364/247; 364/248.6; 364/231.8; 364/DIG. 1
[58] Field of Search ............... 364/300, 200 MS File, 364/900 MS File; 395/425

[56] References Cited

U.S. PATENT DOCUMENTS

| | | | |
|---|---|---|---|
| 4,092,713 | 5/1978 | Scheuneman | 364/200 |
| 4,345,309 | 8/1982 | Arulpragasam et al. | 364/200 |
| 4,349,871 | 9/1982 | Lavy | 364/200 |
| 4,354,232 | 10/1982 | Ryan | 364/200 |
| 4,370,710 | 1/1983 | Krott | 364/200 |
| 4,392,200 | 7/1983 | Arulpragasam et al. | 364/200 |
| 4,594,655 | 6/1986 | Ha | 364/200 |
| 4,594,682 | 6/1986 | Drimak | 364/900 |
| 4,620,275 | 10/1986 | Wallach et al. | 364/200 |
| 4,631,668 | 12/1986 | Kubo et al. | 364/200 |
| 4,646,233 | 2/1987 | Weatherford | 364/200 |
| 4,677,549 | 6/1987 | Katswia et al. | 364/200 |
| 4,695,943 | 9/1987 | Keeley et al. | 364/200 |
| 4,701,844 | 10/1987 | Thompson | 364/200 |
| 4,722,049 | 1/1988 | Lahti | 364/200 |
| 4,742,446 | 5/1988 | Morioka et al. | 364/200 |
| 4,750,112 | 6/1988 | Jones | 364/200 |
| 4,760,545 | 7/1988 | Imagami et al. | 364/200 |
| 4,811,215 | 3/1989 | Smith | 364/200 |
| 4,855,904 | 8/1989 | Daberkow | 364/200 |
| 4,860,192 | 8/1989 | Sachs | 364/200 |
| 4,884,197 | 11/1989 | Sachs | 364/200 |
| 4,912,632 | 3/1990 | Gach | 364/200 |
| 4,920,477 | 4/1990 | Colwell | 364/200 |
| 4,926,317 | 5/1990 | Wallach | 364/200 |
| 4,933,837 | 6/1990 | Freidia | 364/200 |

FOREIGN PATENT DOCUMENTS 0192578 8/1986 European Pat. Off. .

OTHER PUBLICATIONS

"Convex C-1 Supercomputer System Overview" 1985, pp. 1-2-E19.

Primary Examiner—Thomas C. Lee
Assistant Examiner—Eric Coleman
Attorney, Agent, or Firm—Kenyon & Kenyon

[57] ABSTRACT

A load/store pipeline in a computer processor for loading data to registers and storing data from the registers has a cache memory within the pipeline for storing data. The pipeline includes buffers which support multiple outstanding read request misses. Data from out of the pipeline is obtained independently of the operation of the pipeline, this data corresponding to the request misses. The cache memory can then be filled with the data that has been requested. The provision of a cache memory within the pipeline, and the buffers for supporting the cache memory, speed up loading operations for the computer processor.

27 Claims, 24 Drawing Sheets

Non-unity stride, VLD cache misses, length = 8. Pipeline stage activity across times $t_{26}$ through $t_{39}$, with "DRAIN, HOLD AND BACKUP PIPELINE" regions indicated.

Key: ACTION / ELEMENT / ADDR (HEX) / ENTRY KIND LW MASK

| Load Pipeline Stages | $t_{26}$ | $t_{27}$ | $t_{28}$ | $t_{29}$ | $t_{30}$–$t_{31}$ | $t_{32}$ | $t_{33}$ | $t_{34}$ | $t_{35}$ | $t_{36}$–$t_{37}$ | $t_{38}$ | $t_{39}$ |
|---|---|---|---|---|---|---|---|---|---|---|---|---|
| 10 ADDRESS GENERATOR | | | | | | | | | | | | |
| 12 TB | HOLD 7 468 | HIT 7 468 | | | | | | | | | | |
| 14 CACHE TAG LOOKUP | | ALLOC/VAL 3 468 / CA FILL WR QUAD 115 | QUAD LOOK 7 468 | | | | ALLOC/VAL 4 488 / CA FILL WR QUAD | | | | | ALLOC/VAL 5 488 / CA FILL WR QUAD |
| 16 CACHE TAG COMPARE | | | 3 468 CA FILL WR QUAD | QUAD MISS 7 468 4TH MISS 122 | | | | 4 488 CA FILL WR QUAD | | | | |
| 38 CACHE RAM | | | 3 468 100 WR | WRITE 3 468 CA FILL WR QUAD 124 | | | | 4 488 100 WR | 4 488 CA FILL WR QUAD | | | |
| 40 CD BUS RF DATA CT ADWR | | | | | | 4 488 | 488 | | | | 5 488 | |
| 45 LSI C/A ELEM ADDR | 3 468 | | | 7 468 123 | | | | | | | | |
| 47 LSI DATA DATA | | 468 | | | | | | | | | | 488 |

FIG. 6c

VLD  
CACHE MISSES  
LENGTH = 8

NON - UNITY STRIDE

← DRAIN, HOLD AND BACKUP PIPELINE →

← DRAIN, HOLD AND BACKUP PIPELINE →

KEY:
| ACTION |
| ELEMENT |
| ADDR (HEX) |
| ENTRY KIND |
| LW MASK |

| LOAD PIPELINE STAGES | t40 | t41 | t42 | t43 | t44 | t45 | t46 | t47 | t48 | t49 | t50 | t51 | t52 | t53 |
|---|---|---|---|---|---|---|---|---|---|---|---|---|---|---|
| 10 ADDRESS GENERATOR | | | | | | | | | | | | | | |
| 12 TB | | | | | | | | | | | | | | |
| 14 CACHE TAG LOOKUP | 5 4c8 CA FILL WR QUAD | | | | ALLOC/ VAL 6 4c8 CA FILL WR QUAD | | | | | ALLOC/ VAL 7 4c8 CA FILL WR QUAD | | | | |
| 16 CACHE TAG COMPARE | | 5 4c8 CA FILL WR QUAD | | | | 6 4c8 CA FILL WR QUAD | | | | | 7 4c8 CA FILL WR QUAD | | | |
| 38 CACHE RAM | | | | | | | WRITE 6 4c8 CA FILL WR QUAD | | | | | WRITE 7 4c8 CA FILL WR QUAD | | |
| 40 CD BUS {RF DATA, CT ADWR} | 5 4c8 100 WR | | | | | 6 4c8 100 WR | | | | | 7 4c8 100 WR | | | |
| 45 LSI C/A {ELEM ADDR} | | | | 6 4c8 | | | | 7 4c8 | | | | | | |
| 47 LSI DATA {DATA} | | | | | 4c8 | | | | 4c8 | | | | PARITY OK | LD/ST DONE |

FIG. 7

VLD NON-UNITY STRIDE
CACHE MISSES
LENGTH = 6

KEY

| ACTION |
| ELEMENT |
| ADDR (HEX) |
| ENTRY KIND |
| LW MASK |

← DRAIN, HOLD AND BACKUP PIPELINE →

| LOAD PIPELINE STAGES | t0 | t1 | t2 | t3 | t4 | t5 | t6 | t7 | t8 | t9 |
|---|---|---|---|---|---|---|---|---|---|---|
| 10 ADDRESS GENERATOR | 0<br>408<br>NORMAL | 1<br>420<br>NORMAL | 2<br>438<br>NORMAL | 3<br>450<br>NORMAL | 4<br>468<br>NORMAL | 5<br>480<br>NORMAL | | | | |
| 12 TB | | HIT<br>0<br>408 | HIT<br>1<br>420 | HIT<br>2<br>438 | HIT<br>3<br>450 | HIT<br>4<br>468 | HIT<br>5<br>480 | | | |
| 14 CACHE TAG LOOKUP | | | LOOKUP<br>0<br>408 | LOOKUP<br>1<br>420 | LOOKUP<br>2<br>438 | LOOKUP<br>3<br>450 | LOOKUP<br>4<br>468 | | | |
| 16 CACHE TAG COMPARE | | | | MISS<br>0<br>408<br>202 | MISS<br>1<br>420<br>204 | MISS<br>2<br>438<br>206 | MISS<br>3<br>450<br>208<br>4TH MISS | | | |
| 38 CACHE RAM CDAT | | | | | :<br>0<br>408 | :<br>1<br>420 | :<br>2<br>438 | :<br>3<br>450 | | |
| 40 CD BUS RF DATA | | | | | | | | | | |
| CT ADWR | | | | | | | | | | |
| 45 LSI C/A ELEM ADDR | | | | | 0<br>408 | 1<br>420 | 2<br>438 | 3<br>450 | | |
| 47 LSI DATA DATA | | | | | | | | | | |

FIG. 7A

VLD
CACHE MISSES

NON - UNITY STRIDE

DRAIN, HOLD AND
BACKUP PIPELINE

KEY

| ACTION |
| ELEMENT |
| ADDR (HEX) |
| ENTRY KIND |
| LW MASK |

FIG. 7B

NON-UNITY STRIDE
VLD CACHE MISSES

| | t23 | t24 | t25 | t26 | t27 | t28 | t29 | t30 | t31 | t32 | t33 | t34 | t35 |
|---|---|---|---|---|---|---|---|---|---|---|---|---|---|
| 10 ADDRESS GENERATOR | | | | | | | | | | | | | |
| 12 TB LSI % PA | HIT 5 480 | | | | | | | | | | | | |
| 14 CACHE TAG LOOKUP | DE-COMPOSE 438 CA FILL | LOOKUP 5 480 | | | | | ALLOC/VAL 420 CA FILL | DE-COMPOSE 428 CA FILL | DE-COMPOSE 2 438 CA FILL | | | | |
| 16 CACHE TAG COMPARE | ∷ 430 CA FILL | ∷ 438 CA FILL | MISS 5 480 4TH MISS | | | | | ∷ 420 CA FILL | ∷ 428 CA FILL | ∷ 430 CA FILL | 2 438 CA FILL | | |
| 38 CACHE RAM CDAT | WRITE ∷ 428 CA FILL | WRITE ∷ 430 CA FILL | WRITE ∷ 438 CA FILL | | | | | | WRITE ∷ 420 CA FILL | WRITE ∷ 428 CA FILL | WRITE ∷ 430 CA FILL | WRITE 2 438 CA FILL | |
| 40 CD BUS CT ADWR RF DATA | ∷ 430 NULL WR | ∷ 438 NULL WR | | | | | | ∷ 420 NULL WR | ∷ 428 NULL WR | ∷ 430 NULL WR | 2 438 100 WR | | |
| 45 LSI C/A ELEM ADDR | 438 | | | | | 420 | | | 420 | 428 | 430 | 438 | |
| 47 LSI DATA DATA | 438 | | | 5 480 | | | 420 | 428 | | | | | |

DRAIN, HOLD AND BACKUP PIPELINE (t27)
DRAIN, HOLD AND BACKUP PIPELINE (t34–t35)

KEY
ACTION
ELEMENT ADDR (HEX)
ENTRY KIND
LW MASK

FIG. 7C

NON-UNITY STRIDE
VLD CACHE MISSES

KEY

| ACTION |
| ELEMENT ADDR (HEX) |
| ENTRY KIND LW MASK |

DRAIN, HOLD AND BACKUP PIPELINE

| | t36 | t37 | t38 | t39 | t40 | t41 | t42 | t43 | t44 | t45 | t46 | t47 | t48 | t49 |
|---|---|---|---|---|---|---|---|---|---|---|---|---|---|---|
| 10 ADDRESS GENERATOR | | | | | | | | | | | | | | |
| 12 TB LSI % PA | 440 | | | | | | | | | | | | | |
| 14 CACHE TAG LOOKUP | | ALLOC/VAL :: 440 CA FILL | DE-COMPOSE :: 448 CA FILL | DE-COMPOSE 3 450 CA FILL | DE-COMPOSE -458 CA FILL | | | | | ALLOC/VAL :: 460 CA FILL | DE-COMPOSE 4 468 CA FILL | DE-COMPOSE :: 470 CA FILL | DE-COMPOSE :: 478 CA FILL | |
| 16 CACHE TAG COMPARE | | | :: 440 CA FILL | :: 448 CA FILL | 3 450 CA FILL | -458 CA FILL | WRITE -458 CA FILL | | | | :: 460 CA FILL | 4 468 CA FILL | :: 470 CA FILL | :: 478 CA FILL |
| 38 CACHE RAM CDAT | | | WRITE :: 440 CA FILL | WRITE :: 448 CA FILL | WRITE 3 450 CA FILL | WRITE 3 458 CA FILL | | | | | | WRITE 4 460 CA FILL | WRITE 4 468 CA FILL | WRITE 4 470 CA FILL |
| 40 CD BUS RF DATA CT ADWR | | | :: 440 NULL WR | :: 448 NULL WR | 3 450 100 WR | NULL WR | | | | | :: 460 NULL WR | :: 468 100 WR | :: 470 NULL WR | :: 478 NULL WR |
| 45 LSI C/A ELEM ADDR | | | | | | | | | | | 4 468 | :: 470 | :: 478 | |
| 47 LSI DATA DATA | | 440 | 448 | 450 | 458 | | | | 468 | | | | | |

FIG. 7D

VLD  NON-UNITY STRIDE
CACHE MISSES

DRAIN, HOLD AND
BACKUP PIPELINE

KEY

| ACTION |
| ELEMENT |
| ADDR (HEX) |
| ENTRY KIND |
| LW MASK |

| | t50 | t51 | t52 | t53 | t54 | t55 | t56 | t57 | t58 | t59 | t60 |
|---|---|---|---|---|---|---|---|---|---|---|---|
| 10 ADDRESS GENERATOR | | | | | | | | | | | |
| 12 TB LSI % PA | | | 480 | | | | | | | | |
| 14 CACHE TAG LOOKUP | | | | ALLOC/VAL 5 480 CA FILL | DE-COMPOSE 488 CA FILL | DE-COMPOSE 490 CA FILL | DE-COMPOSE 498 CA FILL | | | | |
| 16 CACHE TAG COMPARE | | | | | 5 480 CA FILL | 5 488 CA FILL | : 490 CA FILL | : 498 CA FILL | | | |
| 38 CACHE RAM | | | | | | WRITE 5 480 CA FILL | WRITE : 488 CA FILL | WRITE : 490 CA FILL | WRITE : 498 CA FILL | | |
| 40 CD BUS CDAT RF DATA CT ADWR | | | | | 5 100 WR | 5 488 NULL WR | : 490 NULL WR | : 498 NULL WR | | | |
| 45 LSI C/A ELEM ADDR | | | | | | | | | | | |
| 47 LSI DATA DATA | | | | 480 | 488 | 490 | 498 | | | PARITY OK | LD/ST DONE |

KEY
| ACTION |
| ELEMENT |
| ADDR (HEX) |
| ENTRY KIND |
| LW MASK |

VLD UNITY STRIDE
CACHE HITS
HEXAWORD ALIGNED BASE ADDRESS
LENGTH = 9

| | $t_0$ | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ |
|---|---|---|---|---|---|---|---|---|---|---|---|---|---|
| 10 ADDRESS GENERATOR | 0<br>400<br>NORMAL<br>RD<br>HEX | 4<br>420<br>NORMAL<br>RD<br>HEX | STALL<br>8<br>440<br>NORMAL<br>RD<br>HEX | STALL<br>8<br>440<br>NORMAL<br>RD<br>HEX | STALL<br>8<br>440<br>NORMAL<br>RD<br>HEX | 8<br>440<br>NORMAL<br>RD<br>HEX | STALL<br>12<br>460<br>NORMAL<br>RD<br>HEX | STALL<br>12<br>460<br>NORMAL<br>RD<br>HEX | STALL<br>12<br>460<br>NORMAL<br>RD<br>HEX | 12<br>460<br>NORMAL<br>RD<br>HEX | STALL<br>16<br>480<br>NORMAL<br>RD<br>HEX | STALL<br>16<br>480<br>NORMAL<br>RD<br>HEX | STALL<br>16<br>480<br>NORMAL<br>RD<br>HEX |
| 12 TB | | HIT<br>0<br>400 | STALL<br>4<br>420 | STALL<br>4<br>420 | STALL<br>4<br>420 | HIT<br>4<br>420 | STALL<br>8<br>440 | STALL<br>8<br>440 | STALL<br>8<br>440 | HIT<br>8<br>440 | STALL<br>12<br>460 | STALL<br>12<br>460 | STALL<br>12<br>460 |
| 14 CACHE TAG LOOKUP | | | HEX<br>LOOKUP<br>0<br>400 | DE-<br>COMPOSE<br>1<br>408 | DE-<br>COMPOSE<br>2<br>410 | DE-<br>COMPOSE<br>3<br>418 | HEX<br>LOOKUP<br>4<br>420 | DE-<br>COMPOSE<br>5<br>428 | DE-<br>COMPOSE<br>6<br>430 | DE-<br>COMPOSE<br>7<br>438 | HEX<br>LOOKUP<br>8<br>440 | DE-<br>COMPOSE<br>9<br>448 | DE-<br>COMPOSE<br>10<br>450 |
| 16 CACHE TAG COMPARE | | | | HEX HIT<br>0<br>400 | 1<br>408 | 2<br>410 | 3<br>418 | HEX HIT<br>4<br>420 | 5<br>428 | 6<br>430 | 7<br>438 | HEX HIT<br>8<br>440 | 9<br>448 |
| 38 CACHE RAM | | | | | READ<br>0<br>400 | READ<br>1<br>408 | READ<br>2<br>410 | READ<br>3<br>418 | READ<br>4<br>420 | READ<br>5<br>428 | READ<br>6<br>430 | READ<br>7<br>438 | READ<br>8<br>440 |
| 40 CD BUS RF DATA CT ADWR | | | | | | 0<br>400<br>100<br>WR | 1<br>408<br>100<br>WR | 2<br>410<br>100<br>WR | 3<br>418<br>100<br>WR | 4<br>420<br>100<br>WR | 5<br>428<br>100<br>WR | 6<br>430<br>100<br>WR | 7<br>438<br>100<br>WR |
| 45 LSI C/A ELEM ADDR | | | | | | | | | | | | | |
| 47 LSI DATA DATA | | | | | | | | | | | | | |

FIG. 9A

| | $t_{13}$ | $t_{14}$ | $t_{15}$ | $t_{16}$ | $t_{17}$ | $t_{18}$ | $t_{19}$ | $t_{20}$ | $t_{21}$ | $t_{22}$ | $t_{23}$ | $t_{24}$ |
|---|---|---|---|---|---|---|---|---|---|---|---|---|
| 10 ADDRESS GENERATOR | 16 480 NORMAL RD HEX | | | | | | | | | | | |
| 12 TB | HIT 12 460 | STALL 16 480 | STALL 16 480 | STALL 16 480 | HIT 16 480 | | | | | | | |
| 14 CACHE TAG LOOKUP | DE-COMPOSE 11 458 | HEX LOOKUP 12 460 | DE-COMPOSE 13 468 | DE-COMPOSE 14 470 | DE-COMPOSE 15 478 | HEX LOOKUP 16 480 | | | | | | |
| 16 CACHE TAG COMPARE | 10 450 | 11 458 | HEX HIT 12 460 | 13 468 | 14 470 | 15 478 | HEX HIT 16 480 | | | | | |
| 38 CACHE RAM | READ 9 448 | READ 10 450 | READ 11 458 | READ 12 460 | READ 13 468 | READ 14 470 | READ 15 478 | READ 16 480 | | | | |
| 40 CD BUS | RF DATA 8 440 | 9 448 | 10 450 | 11 458 | 12 460 | 13 468 | 14 470 | 15 478 | 16 480 | | | |
|  | CT ADWR 100 WR | 100 WR | 100 WR | 100 WR | 100 WR | 100 WR | 100 WR | 100 WR | 100 WR | | | |
| 45 LSI C/A ELEM ADDR | | | | | | | | | | | PARITY DONE | LD/ST DONE |
| 47 LSI DATA DATA | | | | | | | | | | | | |

VLD
CACHE HITS
HEXAWORD ALIGNED BASE ADDRESS
LENGTH = 9

KEY

| ACTION |
| ELEMENT |
| ADDR (HEX) |
| ENTRY KIND |
| LW MASK |

FIG. 10

UNITY STRIDE

VLD
CACHE MISSES
HEX ALIGNED BASE ADDRESS
LENGTH = 22

KEY:
ACTION
ELEMENT
ADDR (HEX)
ENTRY KIND
LW MASK

| | $t_0$ | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ |
|---|---|---|---|---|---|---|---|---|---|---|---|---|---|---|
| 10 ADDRESS GENERATOR | 0<br>400<br>NORMAL | 4<br>420<br>NORMAL | HOLD<br>8<br>440<br>NORMAL | HOLD<br>8<br>440<br>NORMAL | 8<br>440<br>NORMAL | HOLD<br>12<br>460<br>NORMAL | HOLD<br>12<br>460<br>NORMAL | 12<br>460<br>NORMAL | HOLD<br>16<br>480<br>NORMAL | HOLD<br>16<br>480<br>NORMAL | 16<br>480<br>NORMAL | HOLD<br>20<br>4a0<br>NORMAL | HOLD<br>20<br>4a0<br>NORMAL | 20<br>4a0<br>NORMAL |
| 12 TB<br>LSI % PA | | HIT<br>0<br>400 | HOLD<br>4<br>420 | HOLD<br>4<br>420 | HIT<br>4<br>420 | HOLD<br>8<br>440 | HOLD<br>8<br>440 | HIT<br>8<br>440 | HOLD<br>12<br>460 | HOLD<br>12<br>460 | HIT<br>12<br>460 | HOLD<br>16<br>480 | HOLD<br>16<br>480 | HOLD<br>16<br>480 |
| 14 CACHE TAG LOOKUP | | | LOOKUP<br>0<br>400 | DE-<br>COMPOSE<br>232 | | LOOKUP<br>4<br>420 | DE-<br>COMPOSE<br>5<br>428 | | LOOKUP<br>8<br>440 | DE-<br>COMPOSE<br>9<br>448 | | LOOKUP<br>12<br>460 | DE-<br>COMPOSE<br>13<br>468 | |
| 16 CACHE TAG COMPARE | | | | MISS<br>0<br>400 | | | MISS<br>4<br>420 | | | MISS<br>8<br>440 | | | MISS<br>12<br>460 | |
| 38 CACHE RAM | | | | | 234 | | | | | | | | | 236 |
| 40 CD BUS<br>CDAT<br>CT ADWR<br>RF DATA | | | | | | | | 4<br>420 | | | 8<br>440 | | | 12<br>460 |
| 45 LSI C/A<br>ELEM ADDR | | | | | 0<br>400 | | | | | | | | | |
| 47 LSI DATA<br>DATA | | | | | 230 | | | 4<br>420 | | | 8<br>440 | | | 12<br>460 |

FIG. 10A

Rotated figure: pipeline timing diagram for unity stride, VLD cache misses, hex aligned base address, length = 22.

Key: Action / Element Addr (HEX) / Entry Kind / LW Mask

Load Pipeline Stages across times $t_{14}$ – $t_{27}$:

| Stage | $t_{15}$ | $t_{16}$ | $t_{17}$ | $t_{18}$ | $t_{19}$ | $t_{20}$ | $t_{21}$ | $t_{24}$ | $t_{25}$ | $t_{26}$ | $t_{27}$ |
|---|---|---|---|---|---|---|---|---|---|---|---|
| 10 Address Generator | HOLD 20 480 NORMAL | HOLD 20 480 NORMAL | HOLD 20 480 NORMAL | HOLD 20 480 NORMAL | 20 480 NORMAL | | | | | | |
| 12 TB LSI % PA | HOLD 16 480 0 400 | HOLD 16 480 | HOLD 16 480 | HOLD 16 480 | HIT 16 480 | HOLD 20 480 LOOKUP | HOLD 20 480 DE-COMPOSE 17 488 | HOLD 20 480 | HOLD 20 480 | HOLD 20 480 | HOLD 20 480 |
| 14 Cache Tag Lookup | | ALLOC/VAL 0 400 CA FILL | DE-COMPOSE 1 408 CA FILL | DE-COMPOSE 2 410 CA FILL | DE-COMPOSE 3 418 CA FILL | LOOKUP 16 480 | DE-COMPOSE 17 488 | | ALLOC/VAL 4 420 CA FILL | DE-COMPOSE 5 428 CA FILL | DE-COMPOSE 6 430 CA FILL |
| 16 Cache Tag Compare | | | CA FILL | WRITE 0 400 CA FILL | WRITE 1 408 CA FILL | WRITE 2 410 CA FILL | MISS 16 480 4TH MISS WRITE 3 418 CA FILL | | | | 5 428 CA FILL |
| 38 Cache RAM | | | 0 400 100 WR | 1 408 100 WR | 2 410 100 WR | 3 418 100 WR | | | | 4 420 100 WR | 5 428 100 WR |
| 40 CD Bus CDAT RF DATA CT ADWR | | | | | | | | | | | |
| 45 LSI C/A ELEM ADDR | | 400 | 408 | 410 | 418 | | | 4 420 | | 428 | 430 |
| 47 LSI Data DATA | 228 | | | | | | 16 480 | | 420 | | |

Length = 22, Drain, Hold and Backup Pipeline.

FIG. 10B

VLDQ POSITIVE UNITY STRIDE
CACHE MISSES
HEX ALIGNED BASE ADDRESS
LENGTH = 22

KEY:
| ACTION |
| ELEMENT |
| ADDR (HEX) |
| ENTRY KIND |
| LW MASK |

| | $t_{28}$ | | $t_{30}$ | | | | $t_{35}$ | | | | | $t_{40}$ |
|---|---|---|---|---|---|---|---|---|---|---|---|---|
| 10 ADDRESS GENERATOR | | | | | | | | | | | | |
| 12 TB LSI % PA | HIT 20 450 | | | | | | | | | | | |
| 14 CACHE TAG LOOKUP | DE-COMPOSE 7 438 CA FILL | LOOKUP 20 450 | DE-COMPOSE 21 458 | | | | ALLOC/VAL 8 440 CA FILL | DE-COMPOSE 9 448 CA FILL | DE-COMPOSE 10 450 CA FILL | DE-COMPOSE 11 458 CA FILL | | |
| 16 CACHE TAG COMPARE | 6 430 CA FILL | 7 438 CA FILL | MISS 20 450 4TH MISS | 8 440 | | | | | | | | |
| 38 CACHE RAM CDAT | WRITE 5 428 CA FILL | WRITE 6 430 CA FILL | WRITE 7 438 CA FILL | | | | | WRITE 8 440 CA FILL | WRITE 9 448 CA FILL | WRITE 10 450 CA FILL | WRITE 11 458 CA FILL | |
| 40 CD BUS RF DATA CT ADWR | 6 430 100 WR | 7 438 100 WR | | | | | | 8 440 100 WR | 9 448 100 WR | 10 450 100 WR | 11 458 100 WR | |
| 45 LSI C/A ELEM ADDR | | | 20 450 | 20 450 | | | 440 | 448 | 450 | 458 | | |
| 47 LSI DATA DATA | 438 | | | | | | | | | | | |

DRAIN, HOLD AND BACKUP PIPELINE
DRAIN, HOLD AND BACKUP PIPELINE

FIG. 10C

VLD UNITY STRIDE
CACHE MISSES
HEX ALIGNED BASE ADDRESS
LENGTH = 22

KEY:
| ACTION |
| ELEMENT |
| ADDR (HEX) |
| ENTRY KIND |
| LW MASK |

DRAIN, HOLD AND BACKUP PIPELINE

| | t41 | | | | t45 | | | | t50 | | | | |
|---|---|---|---|---|---|---|---|---|---|---|---|---|---|
| 10 ADDRESS GENERATOR | | | | | | | | | | | | | |
| 12 TB LSI % PA | 12 460 | | | | | | | | | | | | |
| 14 CACHE TAG LOOKUP | | ALLOC/ VAL 12 460 CA FILL | DE-COMPOSE 13 468 CA FILL | DE-COMPOSE 14 470 CA FILL | DE-COMPOSE 15 478 CA FILL | | | | ALLOC/ VAL 16 480 CA FILL | DE-COMPOSE 17 488 CA FILL | DE-COMPOSE 18 490 CA FILL | DE-COMPOSE 19 498 CA FILL | |
| 16 CACHE TAG COMPARE | | | 12 460 CA FILL | 13 468 CA FILL | 14 470 CA FILL | 15 478 CA FILL | | | | 16 480 CA FILL | 17 488 CA FILL | 18 490 CA FILL | 19 498 CA FILL |
| 38 CACHE RAM | | | | WRITE 12 460 CA FILL | WRITE 13 468 CA FILL | WRITE 14 470 CA FILL | WRITE 15 478 CA FILL | | | | WRITE 16 480 CA FILL | WRITE 17 488 CA FILL | WRITE 18 490 CA FILL |
| 40 CD BUS CDAT RF DATA CT ADWR | | | | 12 460 100 WR | 13 468 100 WR | 14 470 100 WR | 15 478 100 WR | | | | 16 480 100 WR | 17 488 100 WR | 18 490 100 WR | 19 498 100 WR |
| 45 LSI C/A ELEM ADDR | | | | | | | | | | | | | | |
| 47 LSI DATA DATA | | 460 | 468 | 470 | 478 | | | | | 480 | 488 | 490 | 498 | |

FIG. 11

PIPELINE HAVING AN INTEGRAL CACHE WHICH PROCESSES CACHE MISSES AND LOADS DATA IN PARALLEL

FIELD OF THE INVENTION

The present invention relates to the field of computer processors, and specifically, to a method and apparatus for loading data from a cache memory to registers, and storing data from these registers into the cache memory.

BACKGROUND OF THE INVENTION

The operations of many modern processors are pipelined so as to improve the speed of the processor. Thus, a second load operation will enter a load/store pipeline before a first operation will pass completely through the pipeline. Typically, a cache memory which loads data to a register or stores data from the register is outside of the load/store pipeline. When an operation is passing through the load/store pipeline, the cache memory will be accessed. If the proper data is in the cache memory at the correct address, a hit is returned, and the data is loaded to the registers and the pipelining of operation continues. When requested data is not in the cache memory, a miss is returned and the data must be fetched from the main memory over an external bus. Until the miss is serviced such that the data is retrieved from main memory and loaded to the cache, the pipeline is stalled. Since a retrieval from main memory can be relatively slow compared to the pipeline operation, if there are many cache misses, the load/store operation will be dominated by the servicing of those misses. This loses the performance advantages sought by pipelining.

Vector processors are designed to operate on arrays of information in an extremely fast manner. These vector processors typically include a vector register file that is a data store, which is coupled to arithmetic units which operate on the data stored in the vector register file. Data is loaded into the vector register file from a memory, such as a cache memory. The cache memory can also receive and store data from the vector register file. The cache memory itself receives data from a large, main memory, which is typically coupled by a bus to the vector processor. When data is to be loaded into the vector register file, a load/store pipeline accesses the cache memory for the data elements and sends them over a bus to the vector register file.

In scalar processors, the problem of multiple cache misses can also occur which cause the pipeline to be dominated by the servicing of those misses.

SUMMARY OF THE INVENTION

The present invention retains the pipeline advantages by including a distributed cache integral within the pipeline, rather than have the cache be outside the pipeline. This is achieved by providing a pipeline in a computer processor for loading data to registers and storing data from the registers within a cache memory. The pipeline includes means for loading data from the cache memory to the registers and for storing data from the registers into the cache memory. The loading and storing requests to the cache memory are pipelined. By providing such a distributed cache within the pipeline itself, a greater speed in the loading or storing of data in the cache can be obtained.

In order to service possible misses in the cache during load operations, certain embodiments of the invention provide read miss buffers coupled to a means for determining that a request was a miss. The read miss buffers store command addresses associated with the missed requests and obtain data from out of the pipeline independently of the operation of the pipeline. This data includes command and address information. Finally, the read miss buffers fill the cache memory and the register file with the command address data.

Such an arrangement is particularly advantageous when used in vector processors, since the data elements of an array being loaded into a cache during a vector load operation are not related to one another. Thus, when one of the data elements is a miss, this miss can be serviced at the same time as the pipelined loading of the remaining data elements continues. In other words, the pipeline does not have to stall while the misses are being serviced. The only limitation to the number of read misses which can be serviced before the pipeline must be stopped to fill the cache, is the number of read miss buffers which are used or the number of simultaneous operations that can be supported by the system.

The present invention does not attempt to load a single data element as fast as possible Rather, since the individual elements are not related to one another for purposes of a load operation, speed for the total load is maximized. Again, this is done by continuing to pipeline and load data in the data cache and service misses in a parallel operation. This is done instead of stopping the pipeline to service a miss, which would be the fastest way to load an individual element.

When the cache is part of a pipeline in a scalar processor, the above holds true, i.e., the speed of the overall operations is maximized instead of the speed of operation on a single instruction.

BRIEF DESCRIPTION OF THE DRAWINGS

FIG. 6, 6A, 6B, 6C together show a load operation with non-unity stride in which cache miss signals are generated.

FIG. 7, 7A, 7B, 7C, 7D together show another example of a load operation with non-unity stride in which there are cache misses.

FIG. 8 shows a timing chart for a vector store operation.

FIG. 9-9A show a timing chart for a vector load operation having a unity stride.

FIG. 10, 10A, 10B, 10C and 10D together show a timing chart for a load operation which has a unity stride.

FIG. 11 shows a timing chart for a store operation having a unity stride.

DETAILED DESCRIPTION

Figure 1:
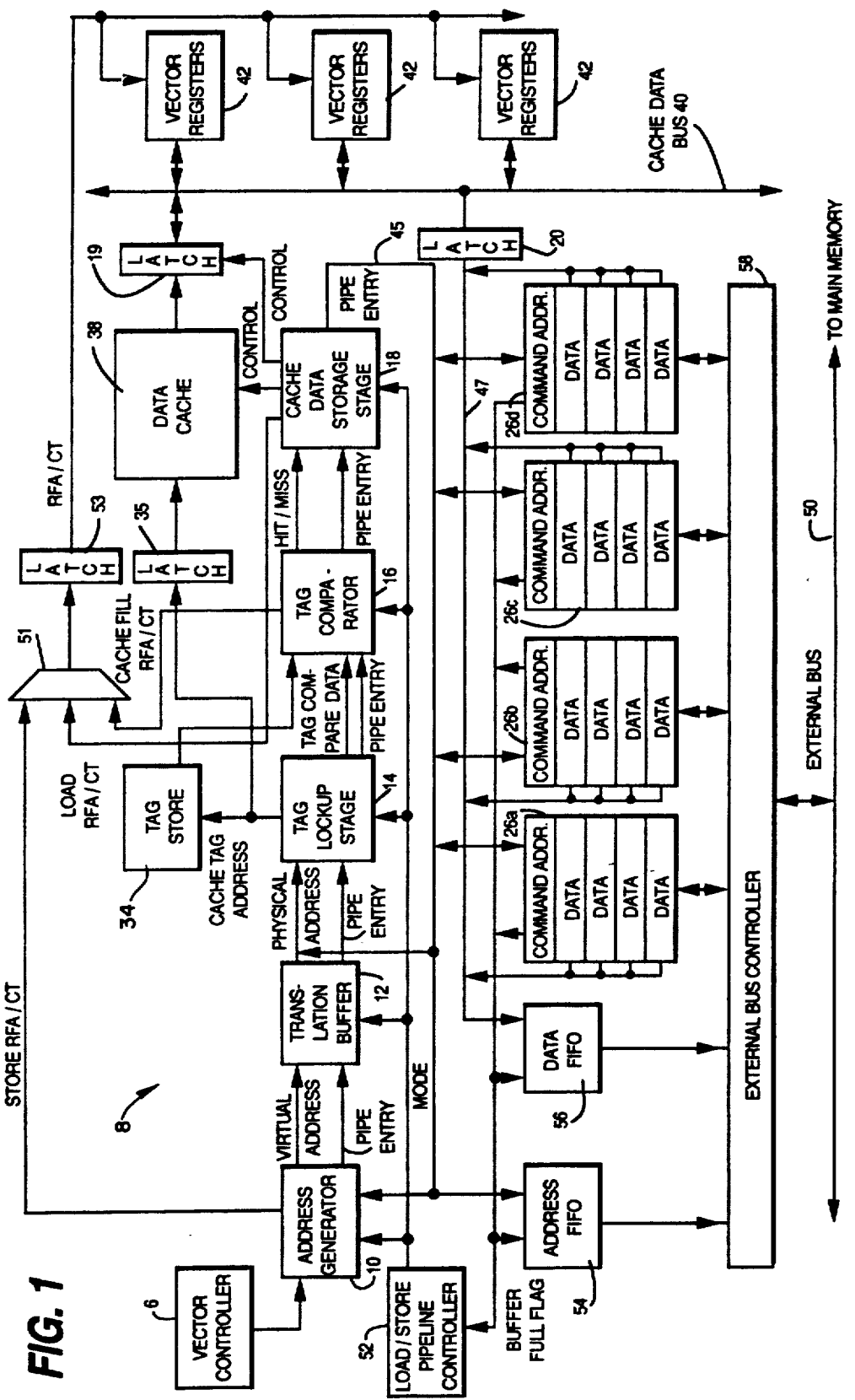
FIG. 1 is a block diagram of an embodiment of a load/store pipeline constructed in accordance with the invention.

An embodiment of the present invention used with a vector processor is illustrated in FIG. 1. A load/store pipeline 8 for the processor has five stages These stages manage pipe entries propagating through the pipeline. An address generator 10 receives commands from a vector controller 6 and generates from these commands pipe entries A pipe entry contains all of the information needed to initiate a transaction between processors or a processor and main memory such as address, element number, byte mask, validity bit, etc. Such transactions are carried out over an external bus 50.

Specifically, an exemplary embodiment of a pipe entry will contain the following bits. Kind bits <2:0> tell each of the five stages what mode to be in for that particular pipe entry. These modes include the "normal" mode (either a load or a store), an invalidate mode, or a read (fill) mode. Element bits <5:0> define which element is being loaded or stored. A valid bit informs as to the validity of the pipe entry. A last bit tells when the pipe entry is the last pipe entry of an instruction. The "don't cache" bit is used in cache fills, and causes the pipeline to not validate the cache, but just put the element into a vector register file. The physical address bits <29:0> correspond to the physical address of the data element in the main memory. Longword mask bits <7:0> contain the information needed to know which elements within a hexaword (to be defined later) are to be loaded or stored.

The pipe entry from the address generator 10 contains a virtual address A translation buffer 12 receives the virtual address and translates it into a physical address. From the translation buffer 12, the pipe entry (which now contains a physical address) enters a cache tag look up stage 14. This look up stage 14 parses the physical address into a cache index and tag compare data. The lookup stage 14 sends the cache index of a cache location to a tag store 34. The tag store 34 is a store of tags for entries in a data cache 38. The tag is made up of a portion of the bits of a physical address Each block of data in the data cache 38 has an associated tag.

The tag portion of the physical address (the tag compare data) is compared with the tag data (located in the tag store 34) for the cache location accessed by this physical address. The comparison is done by a comparator 16. A hit signal is output by the comparator 16 if the tags match, while a miss signal is output if they do not match. The cache index has also been sent by the cache tag look up stage 14 to the data cache 38. In order to know the results of the tag comparison before a decision to write to the data cache 38 is made, a delay stage 35 is interposed between the cache tag look up stage 14 and the data cache 38.

The pipe entry and a hit or miss signal is then sent to the cache data storage stage 18. At this time, the data cache 38 has the physical address of a cache location and will either read data from or write data to that location, as long as there is a hit signal at the cache data storage stage 18. The data cache 38 is connected to a cache data bus 40 via a latch 19. Vector register files 42 which use the data from the cache 38 are also coupled to the cache data bus 40.

When the tags are matched by the tag comparator 16, a hit signal is generated and the data is either driven by the cache data storage stage 18, from a latch 19 coupled to the data cache 38 onto the cache data bus 40, or is driven from a vector register file 42 onto the cache data bus 40 to be stored in the data cache 38. If the tags do not match, the data is still driven but it is ignored by the data cache 38 or the register file 42.

A pipeline entry propagates through one stage every clock cycle, so that a single pipe entry will pass through the pipeline in five cycles. In a vector processor according to the invention, the load/store commands, and hence the pipe entries, are pipelined. This means that a second pipe entry will follow a first pipe entry into the load/store pipeline 8 before the first entry completely passes through the pipeline 8. In the embodiment of FIG. 1, the pipelining is such that during the normal course of operation, all of the five stages at any one time can contain successive pipe entries.

The load/store pipeline 8 operates in one of three modes, as determined by a load/store controller 52. These modes are the load mode, the store mode and the cache fill mode. In the load mode, data is loaded from the data cache 38 to a vector register 42. During a store mode, data is conditionally stored into the data cache 38 from a vector register 42 depending whether the data misses or hits. The cache fill mode will be described later. The load/store controller sends out signals to the pipeline stages which inform the stages what mode the pipeline is to be in.

In order to access each particular location in a vector register file 42, a register file address (RFA) is sent to the vector register file 42 from certain points in the pipeline 8. The RFA is a portion of bits (for example, six) of each pipe entry. With these bits, the vector register file 42 will know where it is to store data coming from the cache 38 in a load operation, or from where data in the file 42 is to be retrieved to send to the cache 38 in a store operation.

The points in the pipeline at which the RFA is "tapped" off and sent to a vector register file 42 are different, depending on the type of operation. This is due to the different cache data bus timing required for each operation. The timing for the various operations will be described in more detail later with reference to FIGS. 2-4. For now, it is sufficient to say that for a store operation, the RFA is tapped off after the address generator stage 10; at the tag comparator stage 16 for a cache fill operation; and after the cache data storage stage 18 for a load operation. The RFA after each of these stages is sent to a multiplexer 51, which selects the appropriate RFA input line depending on a control signal from the load/store controller 52. The appropriate RFA is output by the multiplexer 51 to a delay latch 53 and from there, to the vector register files 42.

During a load operation, no problems arise if all of the tags match so that all of the cache requests are hits. However, sometimes there will be cache misses (when the tags do not match), indicating that there is no valid data at the specified physical address in the data cache 38. These cache misses must be serviced so that the requested data can eventually be read from the cache 38. The servicing of a read miss during a load operation includes obtaining the requested data from another processor or main memory via the external bus 50. The requested data is filled into the data cache 38 at the specified physical address and then driven onto the cache data bus 40 to the vector register file 42.

The above servicing of a miss can be performed in different ways. A relatively slow method is to stop the pipeline upon a read miss, fetch the data over the external bus 50, fill the data to the cache 38 and then restart the pipeline. Such a method would be used when the cache is not part of the pipeline. The speed of this method is limited by the speed with which the external bus 50 can get the requested data to the cache 38. Until then, no other loads would be performed.

The present invention avoids this limitation by servicing a read miss while the pipeline is still operating (performing loads). The invention is implemented using read miss buffers 26a–d. Although four number of read miss buffers could be used. Upon receiving a miss signal during a load operation, the cache data storage stage 18 does not drive data from the cache 38 onto the cache data bus 40. Instead, the cache data stage 18 sends a command address in the pipe entry to an available read miss buffer 26a via a load/store internal command address bus 45. Assuming that successive pipe entries are hits, the loading from the cache 38 continues while the read miss buffer 26a is being filled with data from the main memory via external bus 50 as described below.

Each read miss buffer 26a–d contains buffers for holding the command address of the pipe entry and a number of data elements corresponding to that command address, four for example. An external bus controller 58 requests the data elements from main memory for a buffer which receives a command address. As the data elements are received over the external bus 50, the external bus controller 58 fills the data into the data buffers in the corresponding read miss buffer 26a–d. When a read is set, which indicates to the load/store controller 52 that data can be filled to the cache 38.

In similar fashion, the other three read miss buffers 26b–d will be serviced when there are three more read misses. It is only after there have been four read misses so that there are no more available read miss buffers that the load/store pipeline 8 is stalled by the load/store controller 52. The load/store controller 52 now causes the pipeline 8 to enter the cache fill mode. Processing is suspended for all the pipe entries currently active in the pipeline. Instead, when the read miss buffer 26a which received the first command address which missed has received the data from the external bus 50, the command address stored in the buffer 26a is sent over the command address bus 45 to the cache tag look up stage 14 and is allocated as valid in the tag store 34, since the pipeline 8 is in the cache fill mode. The load/store controller 52 drives the data from the read miss buffer 26a onto a load/store internal data bus 47, through a latch 20, and onto the cache data bus 40. The data is loaded into the appropriate vector register file 42, as indicated by the cache fill RFA. The data is then written through the latch 19 into the data cache 38. The address generator 10 has backed up to regenerate those pipe entries which followed the pipe entry which caused the last miss, in this case the fourth miss.

In the embodiment, the pipeline 8 then continues processing as before since at least one empty read miss buffer 26a–d now exists. The pipeline 8 will again be halted and the above procedures repeated when another read miss occurs so that read miss buffer 26a will again be unavailable. However, instead of filling the cache from the read miss buffer 26a, the read miss buffer, for example 26b, which received the second read miss command address is the buffer which fills the data cache 38. In other words, the read miss buffers 26a–d will fill the data cache 38, when called upon, in the order in which read misses were assigned to the buffers in a round-robin, FIFO order.

In the illustrated embodiment, the fill operation takes place in the order of buffer allocation. Other implementations may fill in different orders. After the vector has been completely scanned, in order to complete the load operation, the cache 38 is filled from the read miss buffers 26a–d with the requested data when this data becomes available. This data is driven onto the load/store data bus 47 and cache data bus 40 to the vector register 42. After all the requested data has been filled to the cache 38 and loaded to the vector register 42, the load operation is complete.

Storing data from the vector register 42 into the data cache 38 is not as involved. The data cache 38 is only changed during a store operation when there is a hit in the tag comparator 16. If there is a cache miss, the data cache 38 remains unchanged. The only consequence of this is that when data is to be loaded from the data cache 38 to the vector register 42 in a load operation, a miss will occur with the miss being serviced as described earlier. For coherency reasons, it is important that the rest of the system knows what is in the data cache 38 at any time. For this purpose, during a store operation, a command address is sent to an address FIFO 54, and the data from the vector register file 42 corresponding to that command address is sent to a data FIFO 56. From these FIFO's 54, 56, the address and data are put onto the external bus 50, through the external bus controller 58 and sent to the system. The above description is for direct mapped write-through data cache. Other embodiments can handle write-back data caches.

The FIFO's 54, 56 are of a size such that they can take one complete vector store operation. This allows the pipeline 8 to be used for a simultaneous load operation. One embodiment has the load operation wait for the store operation to complete if a read miss occurs during the load operation. Should there be a translation buffer miss during the store operation, the store operation will be stopped and the read miss serviced over the external bus 50. In other words, the translation buffer miss operation has priority over the store operation in the use of the external bus 50.

Figures 2, 13:
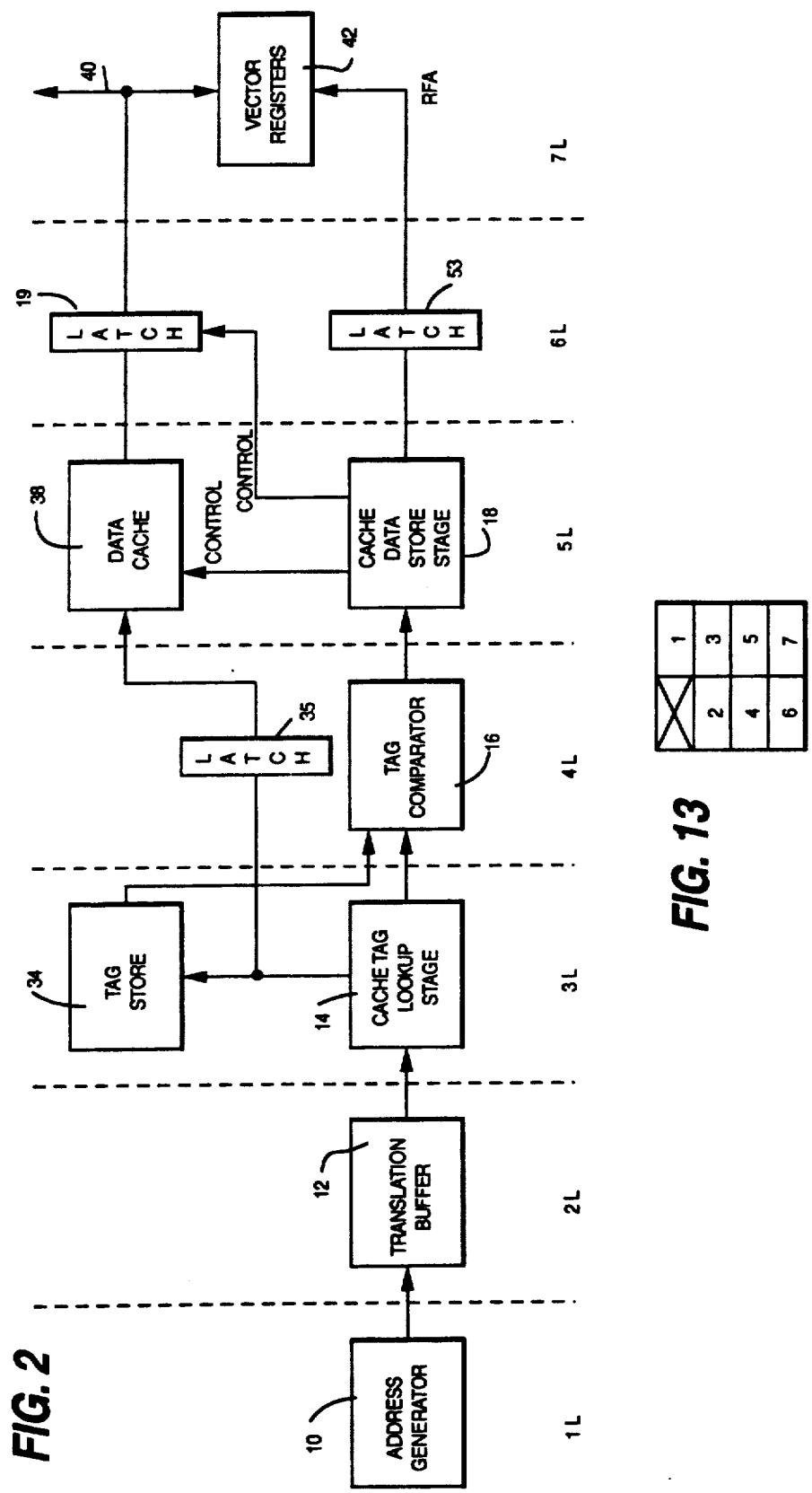
FIG. 2 shows a reconfiguration of the embodiment of FIG. 1 to illustrate the timing in a load operation.
FIG. 13 is an example of a nonaligned hexaword.

The invention has been described for ease of explanation using pipe entries which represent individual quadword (eight contiguous byte) elements However, in the illustrated embodiment, a single pipe entry represents four aligned quadword elements (a hexaword). In this case, the pipe entry is decomposed in the cache tag look up stage 14 into its component quadwords, these quadword addresses being fetched one at a time from the data cache 38. Since only one quadword per cycle can be delivered from the data cache 38, the address generator 10 is stalled during the decomposition until the last quadword of the hexaword is reached. If there is a read miss, then the entire hexaword will be retrieved and eventually filled to the read miss buffers 26a–d and the data cache 38. An example of a hexaword is shown in FIG. 13. Note that in this example, the hexaword is not aligned. In other words, longword 1 is not on the left, so that the first quadword, containing longwords 1 and 2 are not aligned. To account for this, the cycle type information (explained later) and the generation of address and address + 1 by the address generator 10 allow the information to be properly written into the vector registers 42.

The use of the read miss buffers 26a–d to obtain four quadwords at a time speeds the loading process since all of the aligned quadwords within the hexaword would miss if any one of the quadwords missed.

Another embodiment loads single quadword elements on hits, but after a read miss, will retrieve a hexaword to which the quadword that missed belonged. During the cache fill, the hexaword is decomposed, but only the quadword that missed is loaded into the vector register file 42, while the entire hexaword is filled into the cache 38.

A cycle type (CT) is also part of the pipe entry, and informs the vector register files 42 what type of element is being used, such as a quadword or longword and the alignment of the longword within that quadword. The pipe entry data can be double precision numbers (a quadword) or two longwords (single precision floating point) or integer numbers. Due to physical alignments of the longwords in main memory, the load/store unit can request the vector registers 42 to transmit or receive data with the desired longword in the upper or lower longword of the quadword. This is specified by the CT. The CT is tapped off the pipeline 8 at the same locations as the RFA.

Figure 3:
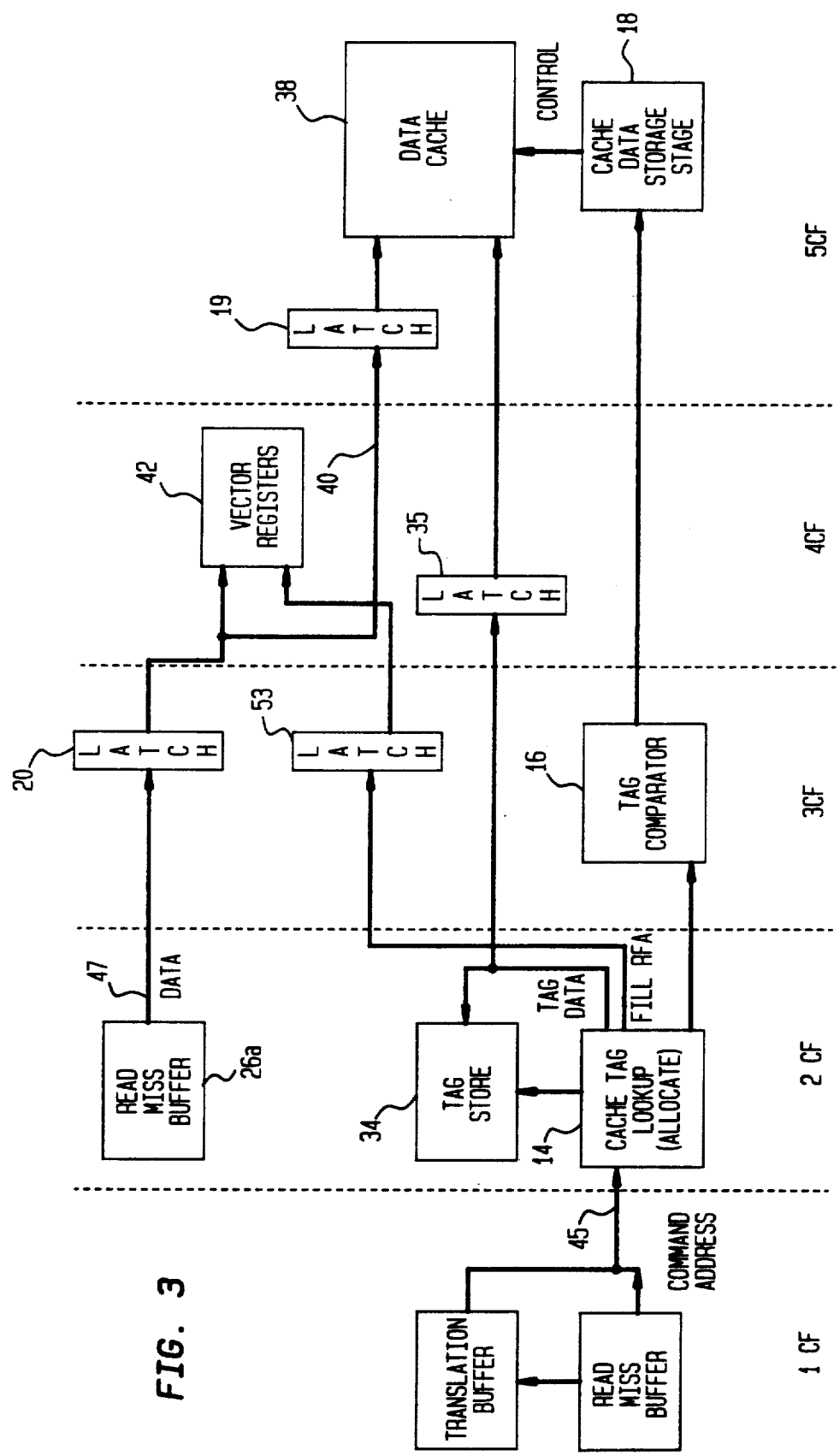
FIG. 3 shows a reconfiguration of the embodiment of FIG. 1 to illustrate the timing in a cache fill operation.
Figure 4:
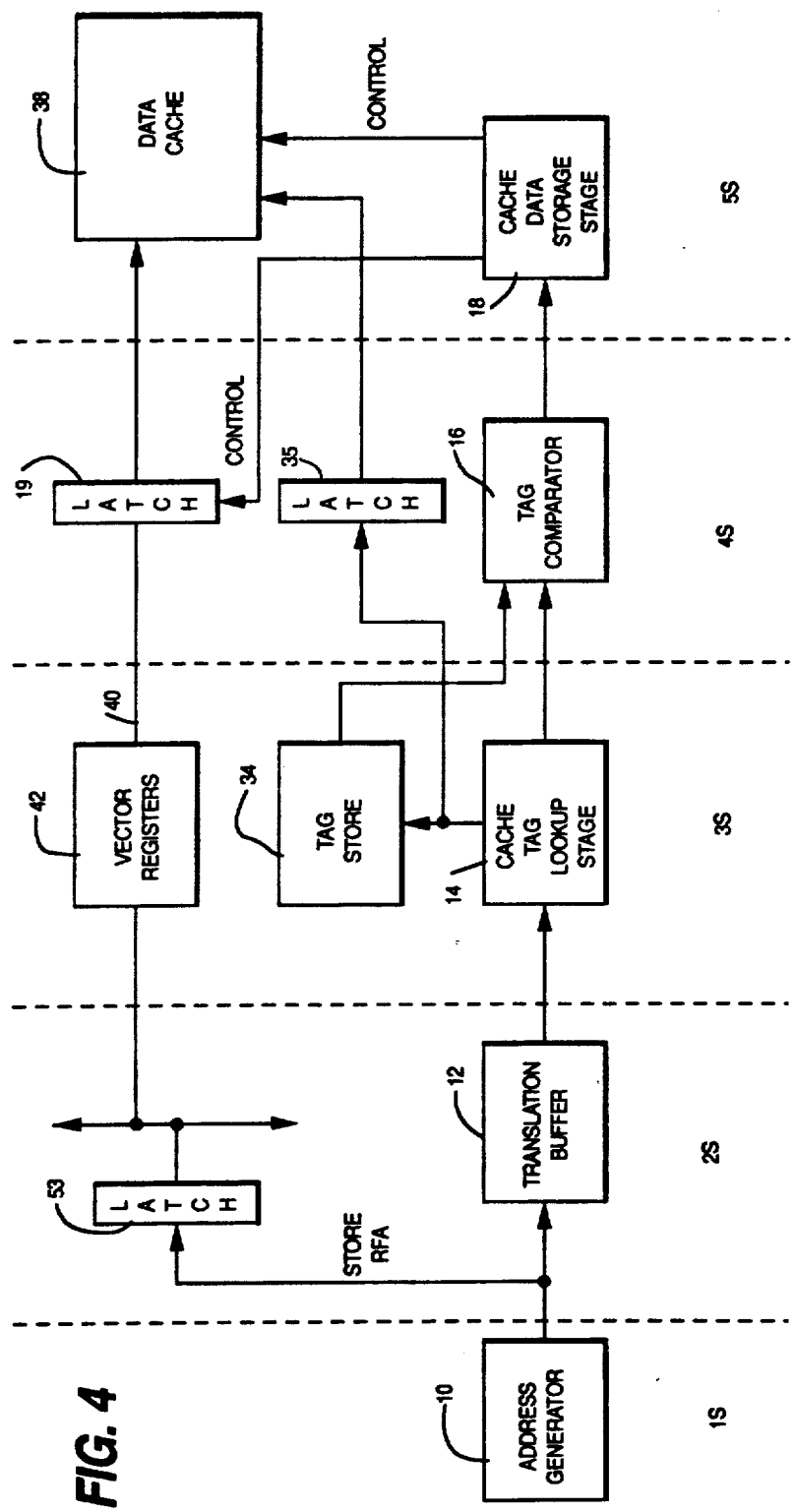
FIG. 4 shows a reconfiguration of the embodiment of FIG. 1 to illustrate the timing in a store operation.

As mentioned earlier, the RFA is tapped off the pipeline 8 at different stages depending on what mode the pipeline 8 is in. FIGS. 2-4 show some of the components of FIG. 1, reconfigured for purposes of explanation in the drawing to show the timing of the various operations.

FIG. 2 illustrates the pipeline configuration for the load operation, where data is loaded from the cache to the vector register 42. In stage 1L, the address generator stage 10 generates a virtual address. The translation buffer 12 translates the virtual address in stage 2L, and the physical cache tag data is looked up in stage 3L. The tag comparison is done in stage 4L, and data is driven out of the data cache 38 in stage 5L into the latch 19, and the RFA is tapped out of the cache data storage stage 18. In stage 6L, the RFA and the data are driven into latches 53 and 19, respectively. In stage 7L, the RFA and the data are driven into the vector register files 42. Note that to satisfy electrical and timing constraints, latches can be used before the data cache 38 and the cache data store stage 18. Such latches would prevent timing race and loading conditions, as one skilled in the art would readily appreciate.

The pipeline configuration for the cache fill operation is shown in FIG. 3. In stage 1CF, the command address which is to be filled is driven from one of the read miss buffers 26a-d (e.g. 26a) onto the command address bus 45. During stage 2CF, the data which was filled into the read miss buffer 26a is driven onto the load/store internal data bus 47. The tag for that command address is written into the tag store 34 by the cache tag lookup 14, which acts as an allocator in the cache fill mode. The RFA is driven out of the cache tag lookup stage 14. In stage 3CF, the data and the RFA are latched, as is the pipe entry by the tag comparator 16 which is acting as a latch and not a comparator in this mode. During stage 4CF, the data on the internal data bus 47 is driven onto the cache data bus 40 and into the vector register files 42. The RFA is also driven to the vector register files 42 at this time. Finally, in stage 5CF, the data is latched, and driven onto the cache data bus 40 and into the data cache 38.

The configuration for stores is shown in FIG. 4. In stage 1S, the virtual address is generated and the RFA is driven out of the address generator stage 10. During stage 2S, the virtual address is translated into a physical address, and the RFA is driven on the cache data bus 40 to the vector register files 42. Because of an inherent two cycle delay, data will appear two cycles later. The physical cache tag data is looked up in stage 3S. In stage 4S, the tag data and the tag compare data are compared, and the vector register files 42 drives the data designated by the RFA onto the cache data bus 40 and latched in latch 19. This data is driven into the data cache 38 during stage 5S. The data is written into the data cache 38 if there is a cache hit, and is ignored if there is a cache miss.

Although FIGS. 2-4 show the various components of FIG. 1 arranged in different positions, note that the couplings between the components are the same as in FIG. 1. The reconfigurations are merely aids for understanding the timing and operation of the embodiment of FIG. 1 in the three different operating modes. The "reconfiguring" is done by the controller 6 sending control signals to the various components.

The timing diagrams shown in FIGS. 5-11 described below illustrate some examples of operation of the invention according to the principles of the invention discussed above.

Figure 5:
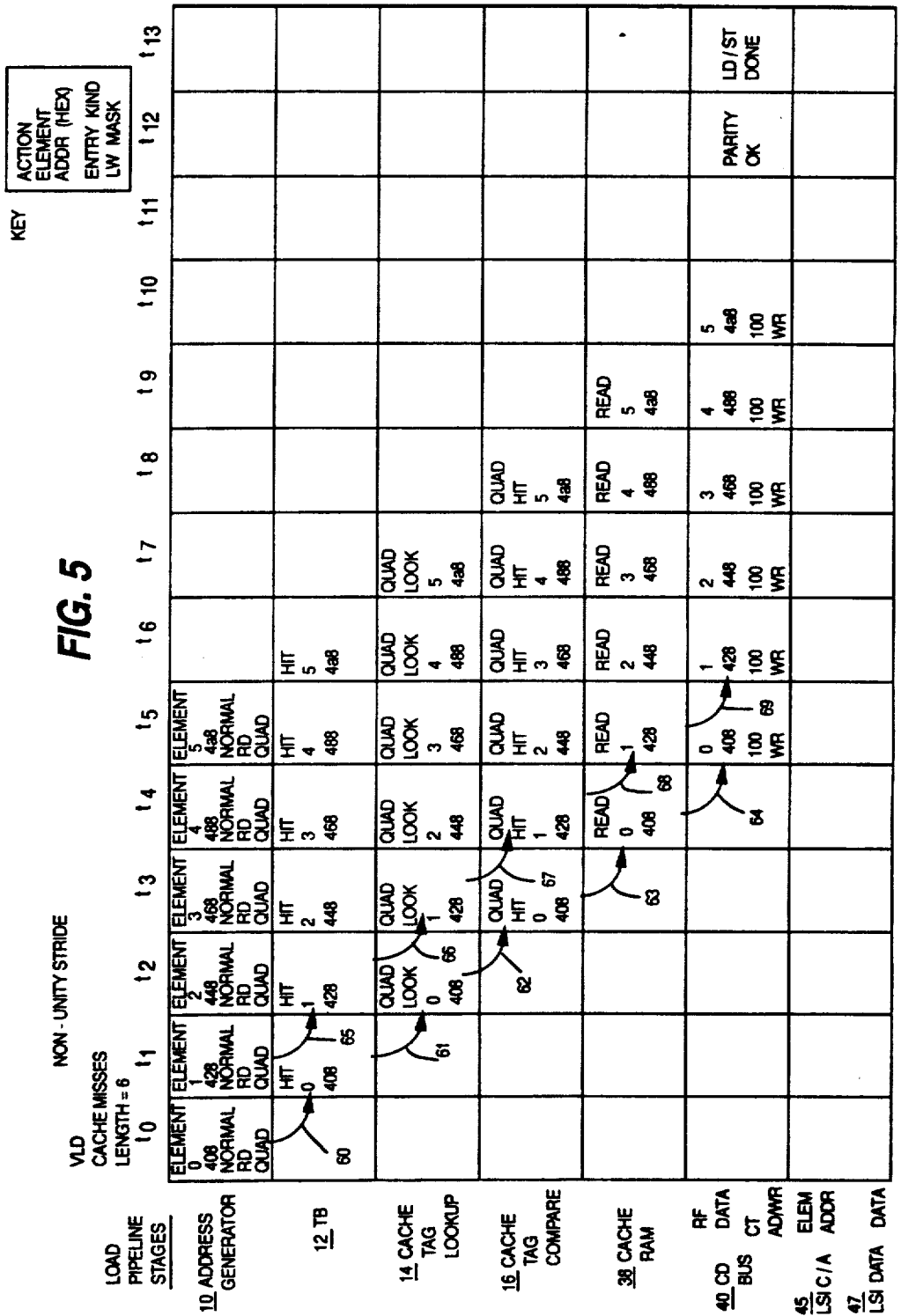
FIG. 5 shows a timing chart for a load operation with non-unity stride using the pipeline shown in FIG. 1.

Referring to FIG. 5 there is shown a timing chart for a load operation in the load/store pipeline. The pipeline stage configuration for a load operation is shown in FIG. 2. The timing chart illustrates a six element load operation. For purposes of FIG. 5, it is assumed that the cache tag comparator 16 will always generate a match or hit. This particular vector load instruction is a six element load instruction transferring eight bytes of information per element.

The load/store pipeline 8 functions by inputting a command or vector instruction into the address generator 10 as shown in FIG. 5 at time $t_0$. The address generator 10 decomposes the vector instruction into an efficient sequence of external bus transactions that will complete the instruction. The output from the address generator 10 is called a pipe entry. All the remaining stages of the load/store pipeline receive and transmit pipe entries. As shown in FIG. 5, the address generated for the pipe entry at time $t_0$ is 408 (hex) for element 0. The pipeline is in a normal mode for a quadword load operation.

At time $t_1$, element 0 is passed through the pipe to the translation buffer 12 as shown by arrow 60. The virtual address from the address generator stage 10 is translated to a physical address by the translation buffer 12.

Due to the nature of a pipeline, the next element 1 enters the address generator stage 10 of the pipe at time $t_1$. Again, the address generator stage decomposes the vector instruction into transactions that will complete the vector instruction. The output of the address generator stage 10 for element 1 is a complete external bus transaction having virtual addresses.

At time $t_2$, element 0 is shifted from the translation buffer 12 into the cache tag look up stage 14 as shown by arrow 61. The cache tag look up stage 14 looks up the tag in the tag store 34 for the physical address and returns it to the cache tag comparator 16. Element 0 is transferred to the cache tag comparator 16 at time $t_3$ where the tag compare is performed. Assuming in FIG. 5 that all cache compares generate a match or hit, element 0 is read in the data cache 38 at time $t_4$ as shown by arrow 63 and illustrated in FIG. 2. The data is then driven out of the data cache 38 into the latch to be placed on the cache data bus 40. Also at time $t_4$, the RFA is driven out of the cache data store stage 18 into a latch 62. At time $t_5$, the RFA/CT is driven from the latch 62 onto the cache data bus 40 as shown by arrow 64. Further, the data for element 0 is driven from latch 19 onto the cache data bus 40 and the cache data bus is instructed to write the vector registers 42 thus completing the load operation for element 0.

Returning to time $t_2$, it is seen that element 1 is passed from the address generator 10 to the translation buffer 12 as shown by arrow 65. Further, element 2 now enters the address generator 10 of the pipeline.

Element 1 is shifted through the stages 14, 16, 38 and 40 of the load/store pipeline as shown by arrows 66–69. Further, elements 2–5 shift in sequence through the pipeline behind this first element. In this manner, the six element load operation completes at time $t_{10}$. The read miss buffers 26a–d are therefore not utilized when the cache tag comparator 16 does not generate a miss.

Figure 6:
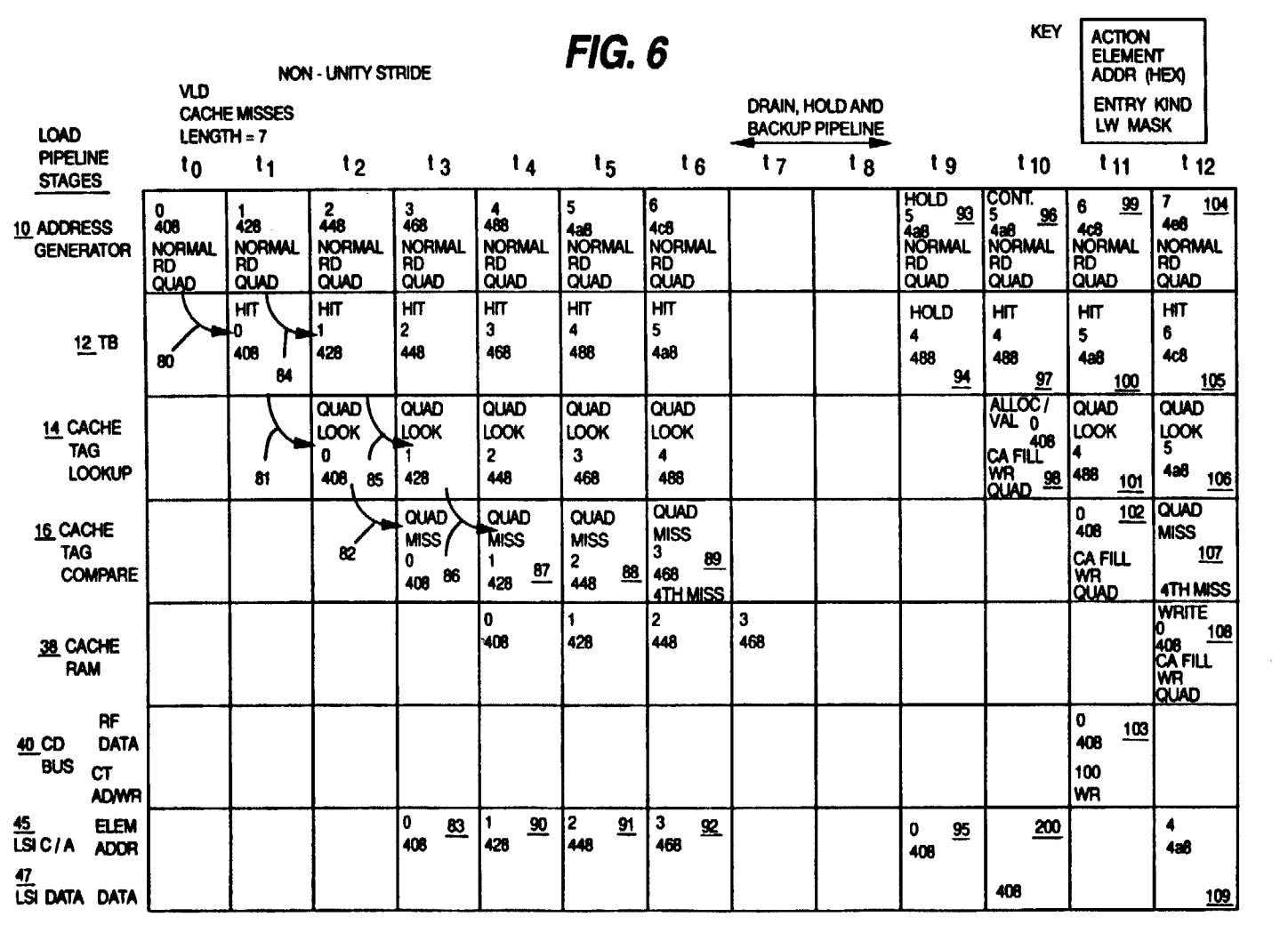

Referring to FIGS. 6–6c in conjunction with FIGS. 2 and 3, there is shown an eight element vector quadword load operation wherein cache miss signals are generated in the cache tag comparator 16. In operation, at time $t_0$, element 0 enters the address generator 10. The operation of the address generator 10 is the same as described above in the vector load operation of FIG. 5. Element 0 passes through the pipe at time $t_1$ to the translation buffer stage 12 as shown by arrow 80. Element 0 continues to transfer stages as shown by arrows 81 and 82 through the cache tag look up stage 14 into the cache tag comparator 16. Again, the operation of the load pipeline is the same as described above. However, at time $t_3$ the cache tag comparator 16 performs a tag compare which results in a cache miss. Therefore, as seen from block 83, the command/address for element 0 is loaded into the first of the four read miss buffers 26a–d over the load/store internal command address bus 45.

The subsequent pipe entries, elements 1–3, pass through the pipe in order until each element generates a cache miss in the cache tag comparator 16. Each cache miss loads the command address of the pipe entry sequentially into one of the four read miss buffers 26a–d through the command address bus 45 as shown in the timing chart by blocks 90–92. As can be seen from the timing chart at time $t_6$, all four of the read miss buffers 26a–d are filled. However, elements 4, 5 and 6 have entered the pipeline before the fourth miss is generated in block 89 by the cache tag comparator 16.

The pipe entry elements 0–3 in the read miss buffers 26a–d are serviced by the external bus 58 which fetches the cache fill information from memory. Because the pipeline queues the four read misses into the read miss buffers 26a–d in the four successive clock ticks, there are no longer any read miss buffers available for the pipeline to use should another read miss occur. However, as indicated above, there are three vector element addresses already started in the pipeline that have not been processed.

As indicated at time $t_7$ and $t_8$, the pipeline 8 must therefore halt while the read miss buffers 26a–d are serviced by the external bus 58. The address generator 10 will back up to the pipe entry element following the pipe entry element which caused the fourth cache miss. Time $t_9$ shows the holding of pipe element 5 in the address generator 10 as indicated by block 93. At the same time $t_9$, element 4 is on hold in the translation buffer 12 as indicated by block 94.

Once the first read miss buffer 26a has been serviced by the external bus 58, the data information is available on the command address bus 45 as indicated by block 95 for element 0. At time $t_{10}$, the pipeline continues with element 5 in the address generator 10 and element 4 recording a hit in the translation buffer 12, as indicated by blocks 96 and 97 respectively. Because the command address is now available on the command address bus 45 and all read miss buffers are filled, the pipeline is changed into the cache fill mode and the physical address for the cache fill is sent to the cache tag lookup stage 14 as shown in block 98. Also as indicated in block 98, the address is allocated and validated in the lookup stage 14. At the same time, the data is available on the internal data bus 47 as shown in block 200.

Continuing at time $t_{11}$, block 99 indicates that element 6 is ready in the address generator 10. In the next stage down the pipeline, element 5 records a hit in the translation buffer 12 as shown by block 100. Further, the cache tag lookup on element 4 is performed in the cache lookup stage 14 as shown by block 101. The cache tag comparator 16, indicated by block 102, now receives the cache fill of element 0 as shown by block 102. At the same time, the cache data bus 40 receives the fill data from the internal data bus 47 as shown in block 103. Further, the fill RFA and CT are driven onto the cache data bus 40.

At time $t_{12}$ the final element 7 enters the address generator 10. Further, elements 6 and 5 have continued through the load pipeline 8 as shown by blocks 105 and 106. At time $t_{12}$, however, element 4 encounters a cache miss in the cache tag comparator 16 as shown by block 107. As was done previously, the cache miss loads the available read miss buffer 26a by using the command address bus 45 as indicated by block 109. At the same time $t_{12}$, the data cache 38 is written with the information from element 0 which was on the cache data bus 40 from the read miss buffers as indicated in block 108.

Figure 6A:
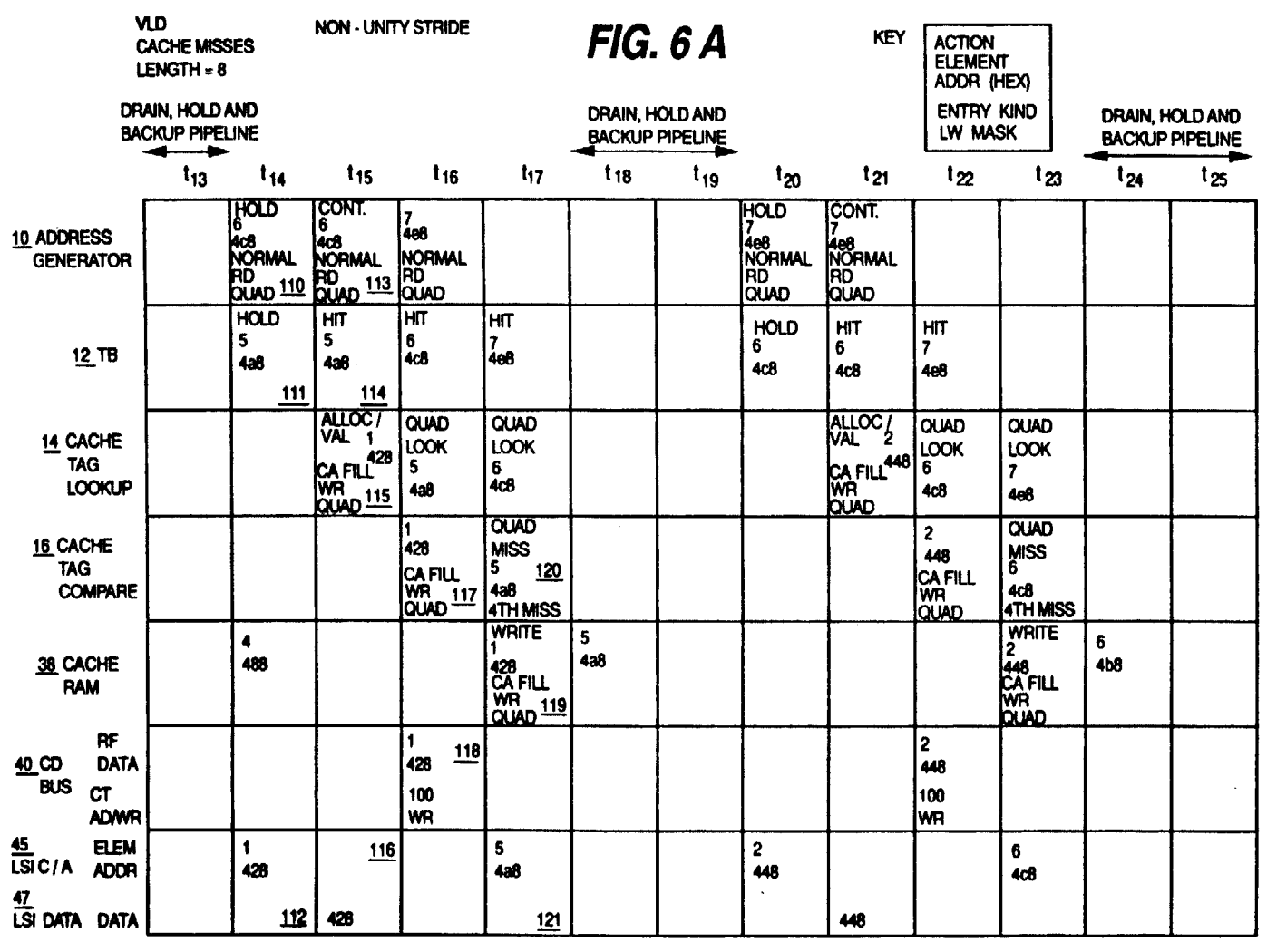

As can be seen from FIGS. 6 and 6A, the four read miss buffers 26a–d are again filled and thus the load pipeline must drain, hold and back up to element 5 as shown at times $t_{13}$ and $t_{14}$. The term "drain" means the permitting of all stages of the pipeline to complete their operation. At time $t_{14}$, element 6 is holding in the address generator 10 and element 5 is holding in the translation buffer 12 as shown by blocks 110 and 111 respectively.

Block 112 indicates that the command address bus 45 now has available the information for servicing element 1 which was the second element placed in one of the read miss buffers 26a–d. At time $t_{15}$, therefore, the pipeline 8 continues with element 6 in the address generator 10 and element 5 recording a hit in the translation buffer 12 as indicated by blocks 113 and 114 respectively. Further, the data for element 1 which was serviced by the external bus 50 is now available on the internal data bus 47 as shown by block 116. The address is input to the cache tag comparator 16 from the command address bus 45 as shown by block 115. The allocation and validation process is performed by the cache tag lookup 14. Continuing at time $t_{16}$, a pipe entry element 7 again enters the address generator 10 of the pipeline 8. Further, element 6 records a hit in the translation buffer 12 and element 5 has the cache tag look up stage 14 perform a tag lookup. At time $t_{16}$, the cache tag comparator 16 receives the cache fill of element 1 as shown by block 117. Further, the cache data bus 40 now has the data and RFA/CT for element 1 available on the bus 40 for writing the vector registers 42.

At time $t_{17}$, as shown in block 119, the data cache 38 has element 1 written to it, so as to complete the cache fill for that element. At the same time, element 5 passes from the cache tag lookup stage 14 to the cache tag comparator 16 where a cache miss is generated as shown in block 120. Again, the cache miss of element 5 is loaded into one of the available read miss buffers 26a–d through the command address bus 45 as seen in block 121.

This sequence of running the load pipeline and servicing the cache fills continues in the pipe until the final element 7 encounters a cache miss in the cache tag comparator 16 as shown at time $t_{29}$ block 122 (FIG. 6B). At time $t_{29}$, the cache miss in element 7 loads one of the available read miss buffers 26a–d through the load/store internal command address bus 45 as shown in block 123. At the same time, as shown in block 124, element 3 is written into the data cache 38 from the cache data bus 40 as was done previously for elements 0-2.

Because the read miss buffers 26a–d are again filled, the load pipeline drains, holds and backs up as shown illustratively at times $t_{30}$ and $t_{31}$. Finally, at time $t_{32}$, element 4 has been serviced by the external bus 50 and is ready to return to the pipeline as is illustrated at times $t_{33}$–$t_{35}$. Element 4 has its cache miss filled as was done previously for the earlier elements. Because no further elements are loaded into the address generator 10 for the vector instruction, the pipeline 8 remains in a cache fill mode to service the remaining read miss buffers until the entire load is completed (FIG. 6C).

An alternative embodiment for a non-unity stride vector load operation is shown in FIGS. 7–7D. The timing charts of FIGS. 7–7D illustrate a six element load operation where each element encounters a cache miss. The load operation is performed substantially as described above for FIGS. 6–6C. However, after the fourth cache miss which fills the read miss buffers, as shown by blocks 202-208 (FIG. 7), the cache fill mode operates differently than described above.

In operation, the cache fill mode has available the command address on the command address bus 45 as shown in block 210 at time $t_{10}$ (FIG. 7A). At time $t_{11}$, the address is input to the cache tag lookup stage 14 for allocation and validation.

The embodiment of FIGS. 7–7D returns a hexaword of information into the read miss buffers rather than the single quadword described above in FIGS. 6–6C. Therefore, although only a single quadword is needed for the non-unity stride operation, the cache tag lookup stage must decompose the hexaword address into its four quadwords as shown during times $t_{12}$ to $t_{14}$. During the decomposition time, the address generator 10 and translation buffer 12 stages of the pipeline hold until the final decomposition at time $t_{14}$.

The data for each quadword is sequentially driven onto the internal data bus 47 as shown by blocks 212-218. On the following clock tick, the data is driven onto the cache data bus 40 as shown during times $t_{12}$ to $t_{15}$. At the same times, $t_{12}$ to $t_{15}$, the RFA/CT is driven onto the cache data bus 40. Because only a single quadword is necessary, the RFA and CT are only valid for one quadword out of the hexaword. This is shown for element 0 having the valid quadword address 408, at time $t_{13}$. On the next clock tick, $t_{14}$, the data cache 38 is written with the fill data.

This process continues as described above for all of the elements in the load operation. FIGS. 7–7D allow a hexaword of information to be fetched by the external bus even though only a single quadword is necessary.

Figure 8:
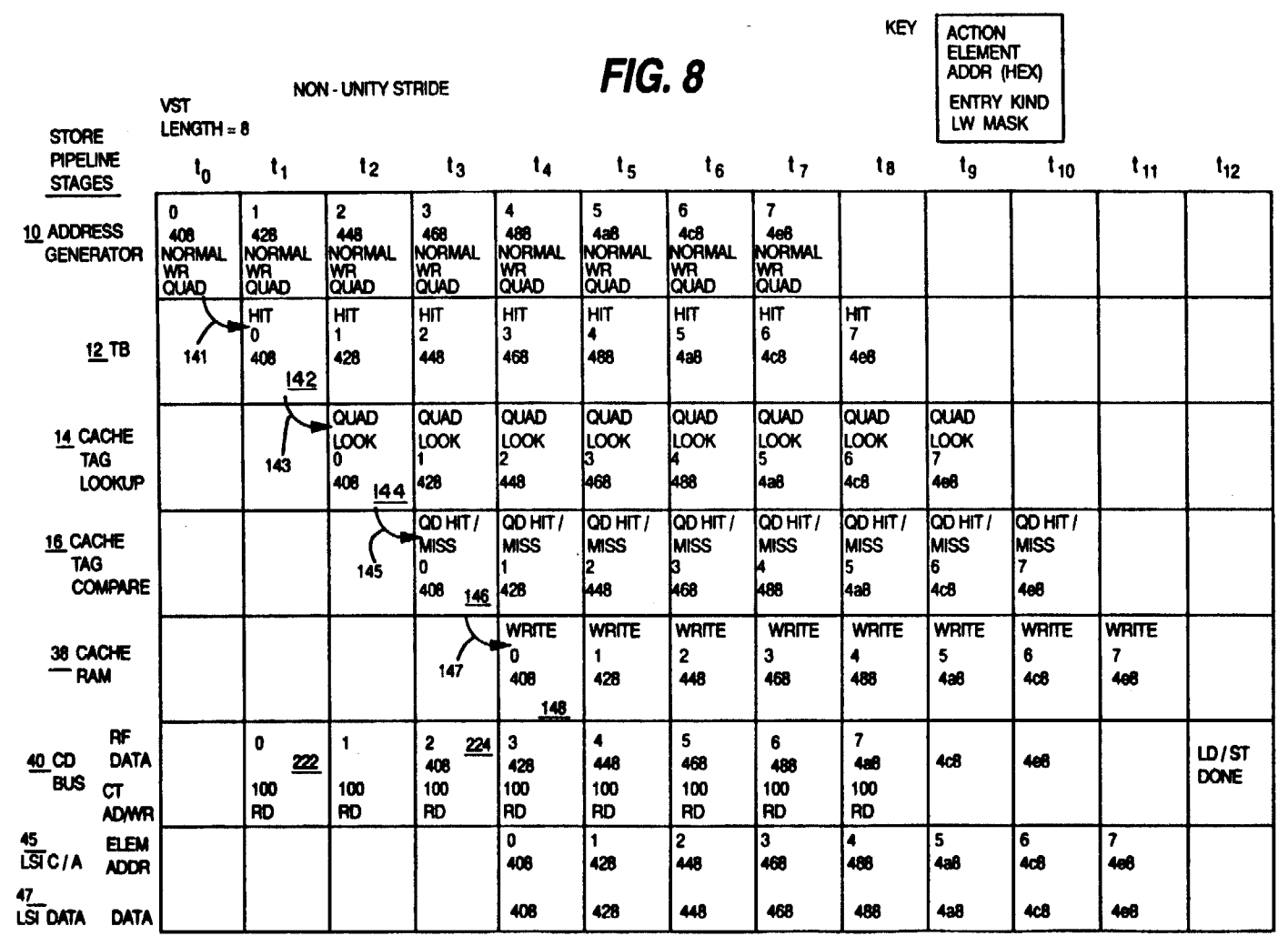

Referring to FIG. 8 in conjunction with FIG. 4, there is shown a timing chart for a vector store operation having eight elements. The operation of FIG. 8 begins with the address generator 10 producing a sequence of pipe entries starting with element 0 as shown in block 140 at time $t_0$. Element 0 passes down the pipeline to the translation buffer 12 as shown by arrow 141 at time $t_1$. The virtual address from the address generator 10 is translated to a physical address in the translation buffer 12. At the same time, the RFA/CT is driven onto the cache data bus 40 as shown in block 222. The store operation reads the data from the vector registers 42.

The physical address is then driven into the cache tag lookup stage 14 as shown by arrow 143 at time $t_2$. The cache tag is looked up and the element 0 passes to the cache tag comparator 16 as shown by arrow 145 at time $t_3$. Also at time $t_3$, the vector registers 42 drives the data onto the cache data bus 40 as shown by block 224. The cache tag comparator 16 performs a tag compare as shown by block 146. Finally, at time $t_4$, the data is driven from the cache data bus 40 and written into the data cache 38 as shown by block 148 when the tag compare, block 146, results in a cache hit. However, if the tag compare results in a cache miss, the cache is unchanged. This operation continues for the entire store operation as shown in FIG. 8.

Referring to FIGS. 9 and 9A, there is shown a timing diagram for a vector load operation having a unity stride. When the stride is unity, the vector elements are stored contiguously in memory. Therefore, each pipe entry produced by the address generator stage 10 represents multiple elements. This takes advantage of the higher external bus bandwidth available when accessing contiguous memory locations. FIGS. 9 and 9A viewed in conjunction with FIG. 2 shows a five hexaword vector operation loading seventeen elements where it is assumed that the cache tag comparator 16 continuously generates a match.

In general, the operation of the load/store pipeline 8 for a unity stride operation is the same as for a non-unity stride operation as described above. However, the address generator 10 can produce a sequence of pipe entries beginning with element 0. Each pipe entry may represent between 1 and 4 elements (i.e., a hexaword). This is shown in the timing chart at address generator 10 where the elements entering the address generator 10 are multiples of four. Thus, the element count is incremented by four for every pipe entry.

As was done previously, each virtual address from the address generator 10 is translated to a physical address in the translation buffer 12. Next, the physical address is passed to the cache tag lookup stage 14 and then to the cache tag comparator 16. A tag compare is performed in the cache tag comparator 16 which, for purposes of FIG. 9, always will result in a cache hit. The block size of the cache is one hexaword; a cache hit indicates that the entire hexaword (all elements contained in the pipe entry) is in the cache.

It is noted that the pipe entry is composed of four sub elements (or quadwords) in FIG. 9. The cache, however, can only deliver one sub element per clock tick. Therefore, as shown during time $t_2$–$t_5$, the pipe entry contained in the cache tag lookup stage 14 must be decomposed into its component sub elements and these sub element addresses are then read from the data cache 38. The sub elements read from the data cache 38 are driven onto the cache data bus 40 and written into the vector registers. While the pipe entry is being decomposed in the cache tag lookup stage 14, the address generator 10 of the pipe is stalled at the next hexaword address ($t_1$). The generator 10 remains stalled until the last sub element of the hexaword is reached.

It is important to note from FIG. 9 that the pipe entry decomposition in the cache tag lookup stage 14 begins before the results of the cache lookup are known in the cache tag comparator 16. Decomposition begins unconditionally and it is assumed that the cache will hit. After the last element has been loaded from the data cache 38, its parity is checked. If the parity is correct, the load/store chip notifies the vector controller that the vector load operation is complete.

Figure 10D:
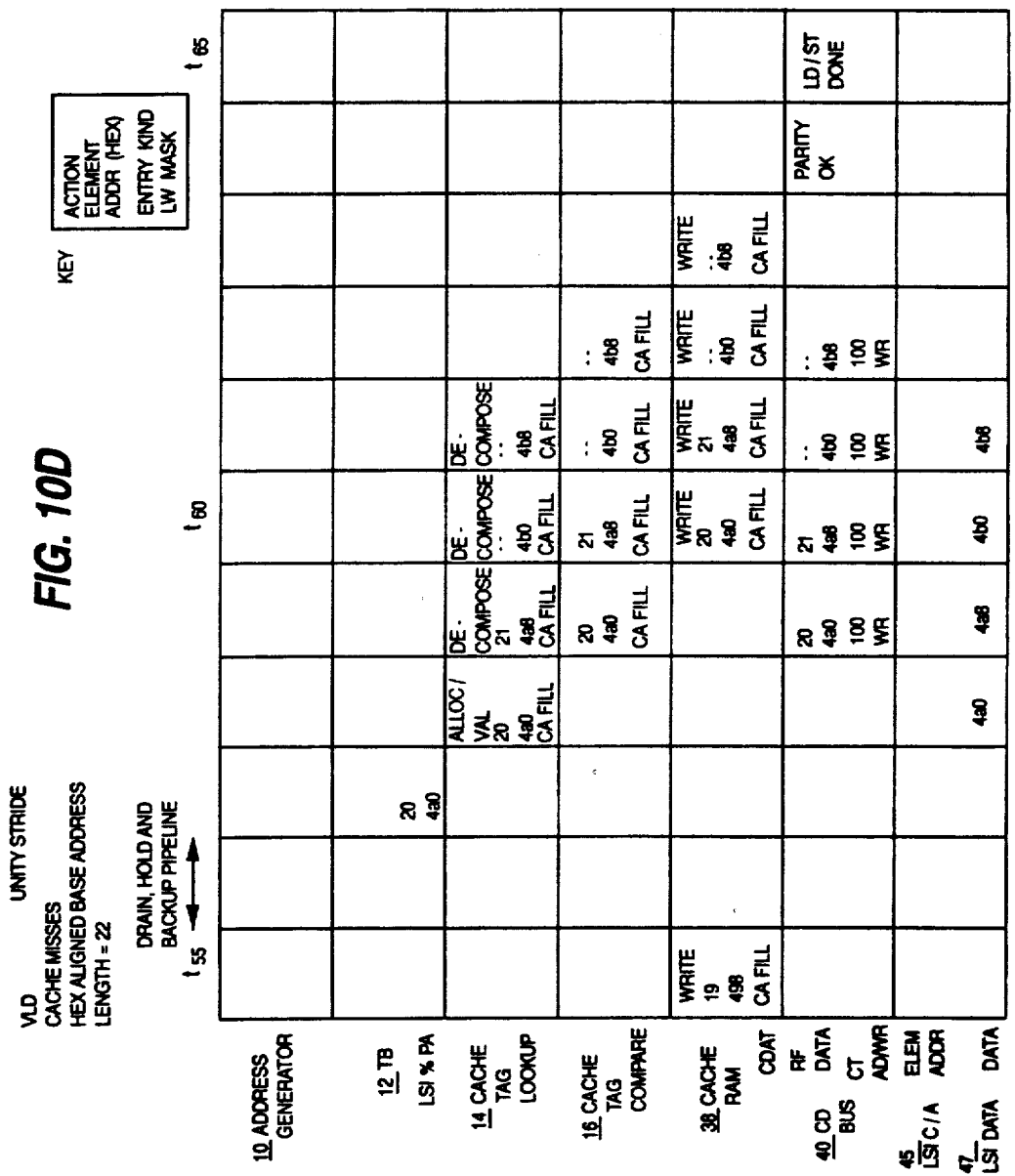

Referring to FIGS. 10-10D, there is shown a unity stride timing chart for a six hexaword vector operation loading twenty-two elements. It is assumed in FIGS. 10-10D that the cache tag comparison will always result in a cache miss. The operation of FIGS. 10-10D, viewed in conjunction with FIGS. 2 and 3, for a unity stride vector load operation is similar to that for the non-unity stride operation illustrated in FIGS. 7-7D.

The initial operation of FIGS. 10-10D, i.e. $t_0$-$t_2$ is the same as that for FIG. 9. However, unlike FIG. 9 which always generates tag hits, the tag compare performed in the cache tag comparator 16 of FIG. 10 always results in a cache miss. The cache miss loads the pipe entry into one of the read miss buffers 26a-d by the command address bus 45, block 230 ($t_4$), for servicing by the external bus 58. The decomposition started in the cache tag lookup stage 14, block 232 ($t_3$), is aborted when this occurs and the resulting pipe entry is ignored as shown in block 234 ($t_4$). The address generator 10 which was stalled when the decomposition started is now released from the stalled condition and produces a new pipe entry when the miss is loaded into the read miss buffer. This operation continues until all four read miss buffers 26a-d are loaded by the command address bus 45, block 236, at time $t_{13}$.

Because there are no more read miss buffers available should another read miss occur, the pipeline must halt and the address generator 10 must back up to the pipe entry following the pipe entry causing the fourth cache miss. The generation of pipe entries will eventually be restarted at this point.

While the pipeline is halted, the address generator 10 and translation buffer 12 stall, $t_{15}$-$t_{18}$ (FIG. 10A), until the first read miss buffer has been serviced the command address being available on the command address bus 45. The command address is used to service the cache fill. Once the external bus 58 has serviced the read miss buffer, the pipe entry from the read miss buffer is delivered to the cache tag lookup stage 14 of the pipe by the command address bus 45 as shown at time $t_{16}$. The cache fill data is driven onto the load/store internal data bus 47 at the same time.

The mode of the pipeline is changed to the cache fill mode by the pipe controller 52. The tag is allocated and validated in the tag store 34 by the tag lookup 14. As shown in FIG. 10A at time $t_{17}$, the pipe entry in the cache tag comparator 16 is now decomposed into its four component sub elements. The four sub elements of the returned hexaword are driven onto the cache data bus 40 during times $t_{17}$-$t_{20}$. The data is written into the data cache 38 during times $t_{18}$-$t_{21}$.

After the first cache fill service completes the decomposition at time $t_{19}$, the pipe controller 52 releases the address generator 10 of the pipe as a read miss buffer is now available if another cache miss occurs. At time $t_{21}$, another cache miss occurs thus pipeline is again halted, backed up and stalled until the next read miss buffer is serviced. This operation continues until all of the elements have been processed. If no further misses occur, the read miss buffers are serviced after all the other elements have been processed through the pipeline.

After the last element has been loaded, and all of the sub elements (quadwords) of the last hexaword fill are complete, the vector controller 6 is notified that the vector load of unity stride is complete.

Figure 11:
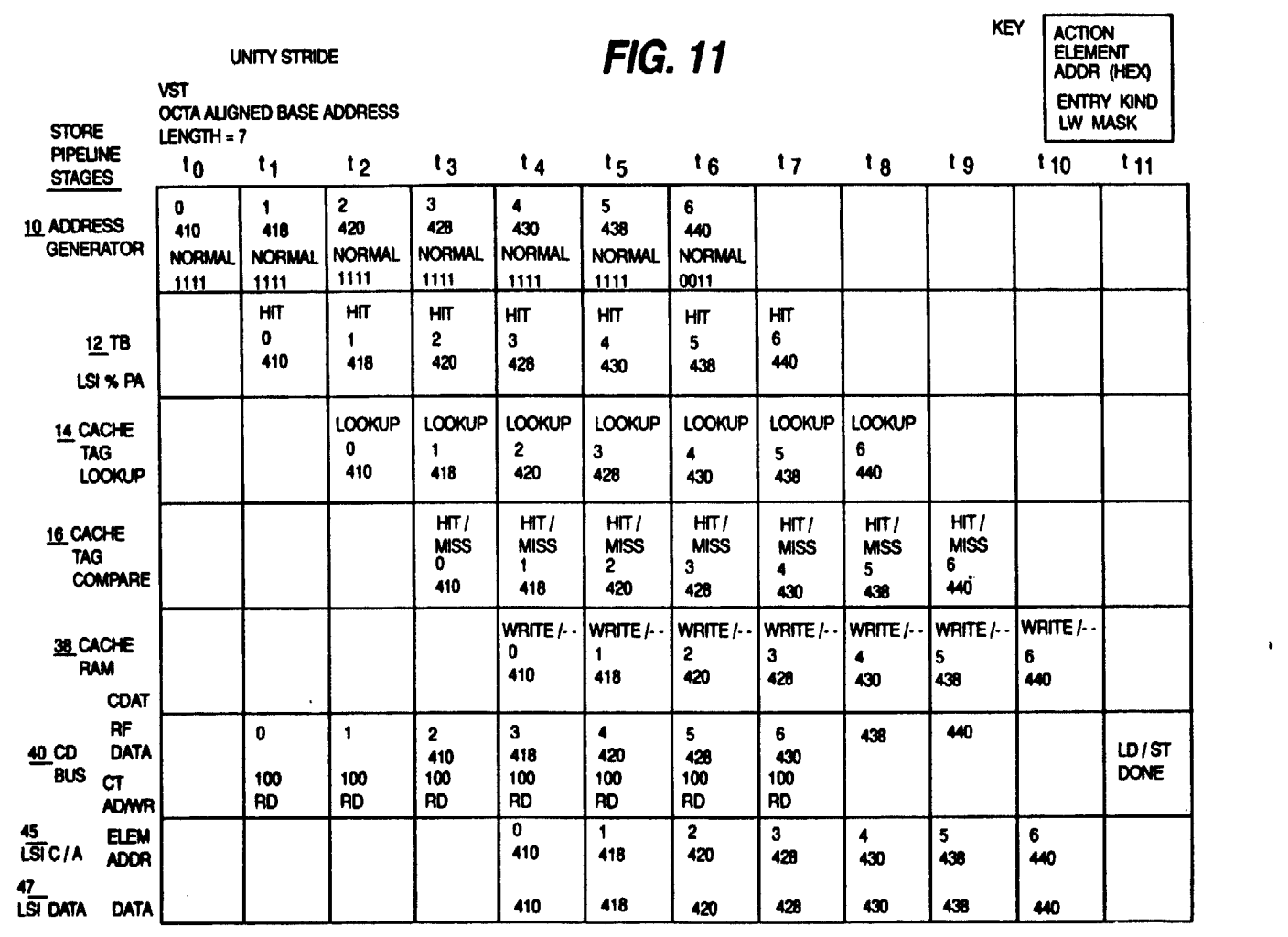

FIG. 11 shows a timing chart for a seven hexaword vector store operation having a unity stride. The operation of FIG. 11 is the same as that of FIG. 8 for a non-unity stride store operation.

Figure 12:
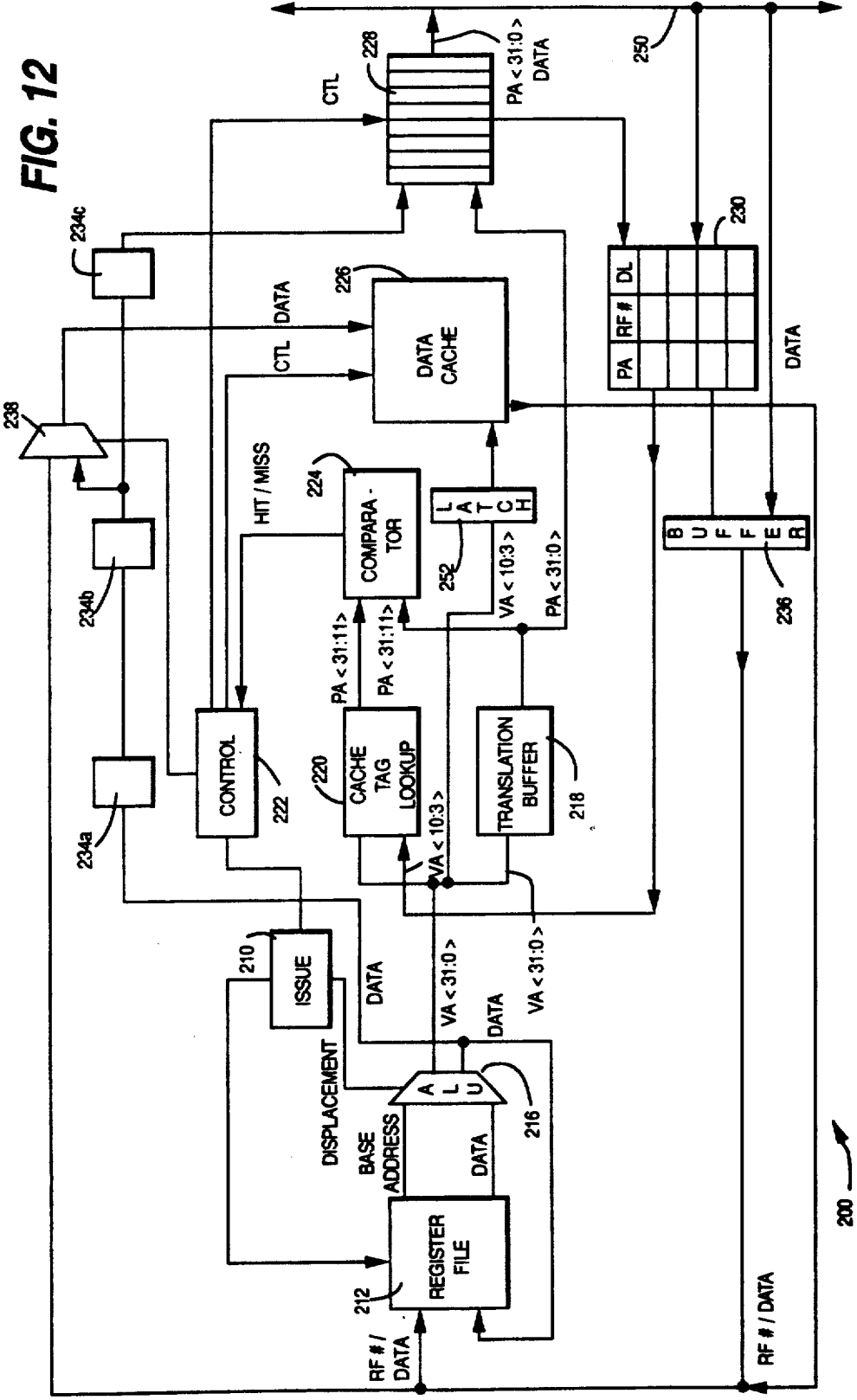
FIG. 12 shows an embodiment of the present invention for use in a scalar processor.

An embodiment of a pipeline with an integral cache for use in a scalar processor according to the present invention is illustrated in FIG. 12. The reference numeral 200 refers to the entire pipeline. The issuer 210 provides a displacement value and control signals depending on the type of instruction, e.g. a load instruction or a store instruction. A register file 212 stores results from an arithmetic logic unit (ALU) 216 and has two write ports and two read ports.

The displacement value from the issuer 210 is added to a base address from the register file 212 by the ALU 216 to produce a virtual address. Such a virtual address can be thirty-two bits for example. The thirty-two bits of virtual address (VA<31:0>) are presented simultaneously to a translation buffer (TB) 218 and a cache tag look up 20 although the cache tag lookup 220 only uses eight bits (VA<10:3>) to index a tag. The translation buffer 218 and cache tag look up 220 each send twenty-one physical address bits (PA<31:11>) to the comparator 224 which produces a hit signal when the bits match or a miss signal when there is a mismatch. The eight bits which are sent to the cache tag look up 220 are the untranslated bits of the virtual address VA<31:0>. Thus, no translation mechanism is necessary in front of the cache tag look up 220, and the tag lookup, address translation and comparison can be done within one cycle. The use of only eight untranslated bits to index the tag is allowed due to the size of the data cache and the page size used in the system.

A controller 222 receives the hit/miss signal from the comparator 224, and will cause the data to be written in or read from the data cache 226 if there is a hit. A latch 252 receives the bits VA<10:3> so that the data cache is indexed one cycle after the comparison. If there is a hit, data is written into the cache (in a store operation) or read from the cache (in a load operation). Due to the cache load or store being performed serially after the comparison, there is an equal number of stages in the pipeline for both the load operation and the store operation.

When there is a miss signal, the entire physical address (PA<31:0>) is sent to an output fifo 228 which is connected to the main memory system of the scalar processor. The address is then sent from the output fifo 228 in order to fetch the data from the main memory. At the same time, the physical address is sent to a memory reference tag 230, which in the illustrated embodiment, has four locations which each store a physical address (PA), a register file number (RF#) and the data length (DL).

It should be noted that control information has been passed down the pipe along with the address, although it has not been shown for purposes of illustration. Some of this information is the register file number which determines where in the register file data is written to; and the data length, which tells the register file 212 what part of the returning data is to be input to the register file 212.

In the embodiment shown in FIG. 12, the output fifo 228 has eight locations and the memory reference tag 230 has four locations. Thus, during a load operation, up to four load misses can be put into the memory reference tag 230 and eight load misses can be put into the output fifo 228. When another load miss occurs while the output fifo 228 is full, no-ops are sent by the issuer 210 until data has been returned over the external bus 250.

When the data is returned, it enters a buffer 236 which sends the data to both the data cache 226 (through multiplexer 238) and the register file 212. The corresponding RF# and DL are sent from the memory reference tag 230 to the register file 212 so that the returned data can be properly written into the register file 212. The physical address (PA<31:0>) is sent to the cache tag lookup 220 and at the indexed location (PA<10:3>), bits PA<31:11> (the tag) will be written so that the next lookup to that tag location will be valid.

Because the data cache 226 is a write-through cache, during write operations in which the data cache 226 is being changed, the rest of the system must know what is in the data cache 226. For this reason, buffers 234A-C are coupled between the register file 212 and the output fifo 228 and pass the data out through the output fifo 228 during every store operation.

During a load operation, when there is a miss, the output fifo provides information to the processor indicating that there is a load operation, the size of the data element requested, the physical address where the data element is located in the main memory of the processor and the tag which is used by the pipeline.

For a store operation the information which is output by the output fifo 228 is the fact that it is a store operation, the size of the data element, the physical address and the data element itself.

Due to the operation of the fifo 228 and the memory reference tag 230, the pipeline 200 of FIG. 12 can support multiple outstanding misses while continuing to operate. In order to continue the pipeline subsequent to a cache miss, dependency checks must be made. To that end, the controller provides for a write abort. Thus, if during a load operation there is a cache miss (so that the memory reference tag 230 or the output fifo 228 contains a miss) which is followed by any store instruction, this subsequent store operation will be aborted. Alternatively, a procedure for checking the dependency between loads and stores is to compare, using a content addressable memory device, the physical address of the store instruction in the output fifo 228 with the physical address in the memory reference tag 230, and performing a write abort if any of the numbers match. A write abort includes aborting all the instructions currently in the pipeline and backing up the program counter in the issuer 210 to reissue all of the instructions subsequent to and including the last store instruction.

What is claimed is:

1. A load/store pipeline in a vector processor for loading data entries to registers and storing data entries from said registers, the pipeline comprising:
   a cache memory for storing data entries;
   a data loading device which loads data entries from said cache memory to said registers and which stores data from said registers into said cache memory with loading and storing data entries from and to said cache memory being pipelined;
   a determining device which determines when one of said data entries is a miss;
   a plurality of read miss buffers coupled to said miss determining device which store command addresses corresponding to said missed data entries and store data entries from out of said pipeline independently of the pipelining of data entries to and from the registers of the vector processor, said stored data entries corresponding to said command addresses;
   a controller utilizing said stored command addresses to obtain and store said corresponding missed data entries in said read miss buffers independently of the pipelining of data entries to and from the registers; and
   a filling device, in parallel with said data loading device, which fills the cache memory with said stored data entries and writes said stored data entries to said registers.
   said data loading device continuing to operate when said determining device determines one of said data entries is a miss.

2. The load/store pipeline of claim 1, wherein said read miss buffers include buffers which store said obtained data entries, receive said command address data entries in arbitrary order from out of said pipeline and fill the cache memory with the data entries in the order the command addresses were stored in said read miss buffers.

3. The load/store pipeline of claim 1, wherein said determining device includes: a cache tag look up stage for parsing a physical address into a cache index and tag compare data; a tag store coupled to the cache tag look up stage for storing tags corresponding to addresses in said cache, said tag store receiving said cache index and outputting corresponding tag data; and a comparator coupled to said tag store and said cache tag look up stage for receiving said tag data and said tag compare data and generating a hit signal when said tag data and said tag compare data match, and a miss signal when said tag data and said tag compare data do not match.

4. The load/store pipeline of claim 3, further comprising a delay coupled between said cache tag look up stage and said cache memory which delays receipt of said cache tag address by said cache memory.

5. The load/store pipeline of claim 4, further comprising an address generator coupled to said cache tag look up stage for receiving load and store commands and generating pipe entries which include virtual addresses.

6. The load/store pipeline of claim 5, further comprising a translation buffer coupled between said cache tag lookup stage and said address generator for translating said virtual addresses into physical addresses.

7. The load/store pipeline of claim 1, wherein said read miss buffers include buffers that store said command addresses, receive said command address data in arbitrary order from out of said pipeline and fill the cache memory with the data in the order the command addresses were stored in said read miss buffers.

8. The load/store pipeline of claim 7, wherein said cache memory is coupled to said cache look up stage so as to receive a cache index.

9. The load/store pipeline of claim 1, further comprising a load/store controller for controlling the pipeline into either a load mode, a store mode or a cache fill mode.

10. The load/store pipeline of claim 1, wherein said loading device includes a cache data bus coupled to said cache memory and to said registers which transfers data entries between said cache memory and said registers; and said filling device includes an internal data bus coupling said read miss buffers to said cache data bus and carrying said obtained data entries.

11. The load/store pipeline of claim 1, wherein said read miss buffers include obtaining devices which obtain additional data entries from out of said pipeline when said data entry corresponding to said command address is obtained, and wherein said filling device fills the cache memory with said obtained data entry and said additional data entries.

12. The load/store pipeline of claim 11, wherein said data entries are longwords, and said additional data entries are longwords within an aligned hexaword which contains a longword corresponding to said obtained data.

13. The load/store pipeline of claim 1, wherein said data is a quadword having two longwords.

14. The load/store pipeline of claim 13, wherein said entries contain information regarding alignment of said longwords of a quadword such that nonaligned longwords are storable in said registers.

15. The load/store pipeline of claim 14, wherein said information is cycle type information and said register is presented by said pipeline with an address and an address plus 1 for each said quadword.

16. The load/store pipeline of claim 1, further comprising a write buffer coupled to said cache memory which buffers data entries corresponding to a storing operation out of said pipeline, said write buffer having a capacity to store contents of an entire register, such that an operation subsequent to said storing operation can be performed in said pipeline while said data entries corresponding to said storing operation are buffered out of said pipeline.

17. The load/store pipeline of claim 16, wherein said write buffer is a dynamically configurable write buffer which is configurable during storing operations to accommodate different data formats.

18. A method of loading data from a cache to registers in a vector processor pipeline, the method comprising the steps of:
a) requesting a data block from said cache;
b) checking whether there is a hit in said cache for said block of data to be loaded, said hit indicating that said data block is in said cache, and a miss indicating said data block is not in said cache;
c) driving said data block from said cache to said registers when there is a hit; and
d) obtaining said data block from a memory when there is a miss and writing said obtained data block into said cache and said registers, wherein steps a, b, and c are repeated for subsequent data blocks after the step of checking for said data block indicates a miss; and wherein the step of the obtaining of said data block is performed during the repeating of steps a, b, and c for said subsequent data blocks.

19. The method of claim 18, wherein step d) includes the steps of sending a command address so at least one read miss buffer, receiving in said read miss buffer said data block from the memory over an external bus, and sending said data block to said cache and said registers via an internal data bus.

20. The method of claim 19, wherein said data block includes a plurality of individual data elements, and said read miss buffer sends said data block only when all said data elements of said data block are received from the memory.

21. The method of claim 20, wherein a plurality of read miss buffers are provided, and further comprising the steps of: e) halting the repeating of steps a, b and c when all of said read miss buffers contain a command address; f) writing an obtained data block in one of said read miss buffers into said cache and said registers; and g) repeating steps a, b, c and d until all said read miss buffers contain command addresses and then repeating steps e, f and g, until all of said data blocks are loaded into said registers.

22. The method of claim 19, wherein step d includes obtaining said data block and further data blocks when there is a miss, and said read miss buffer sends said data block and said further data blocks to said cache and said registers, with said data block and said further data blocks being filled in said cache and only said data block being written into said registers.

23. The method of claim 18, wherein said loading of data occurs simultaneously with a portion of a previous storing operation in which data blocks are sent to said memory.

24. The method of claim 23, further comprising the step of halting said storing operation when there is a miss during the loading operation.

25. A pipeline in computer processor for loading data entries in registers and storing data entries from said registers, the pipeline comprising:
a cache memory for storing data;
a loading device which loads data entries from said cache memory to said registers and which stores data entries from said registers in said cache memory with loading and storing data entries from and to said cache memory being pipelined;
a determining device which determines when one of said data entries is a miss;
a controller operating to obtain a return data entry corresponding to the one of the data entries determined to be a miss, the controller operating independently of the pipelining of data entries to and from the registers;
a storage device coupled to the controller for storage of the return data entry;
a filling device coupled to the storage device which fills the cache memory with said return data entry, said pipeline continuing to operate without stalling in the presence of missed data entries.

26. The pipeline of claim 25, further including a controller which aborts instructions within said pipeline when one of said missed data entries corresponds to a load instruction and one of said data entries within said pipeline corresponds to a store instruction subsequent to said load instruction.

27. The pipeline of claim 26, further including a content addressable memory which compares information in said missed data entries which correspond to said load instructions with information in said data entries which correspond to said store instruction and causes said controller to abort said instructions within said pipeline based on said comparison.

* * * * *